(12) United States Patent
Williamson

(10) Patent No.: US 11,732,805 B2
(45) Date of Patent: Aug. 22, 2023

(54) VALVE COMPONENT

(71) Applicant: Trelleborg Westbury Limited, Tewkesbury (GB)

(72) Inventor: Mark Williamson, Westbury (GB)

(73) Assignee: Trelleborg Westbury Limited, Tewkesbury (GB)

(*) Notice: Subject to any disclaimer, the term of this patent is extended or adjusted under 35 U.S.C. 154(b) by 0 days.

(21) Appl. No.: 17/941,474

(22) Filed: Sep. 9, 2022

(65) Prior Publication Data
US 2023/0014688 A1 Jan. 19, 2023

Related U.S. Application Data

(63) Continuation of application No. 17/192,582, filed on Mar. 4, 2021, now Pat. No. 11,466,781.

(30) Foreign Application Priority Data

Mar. 5, 2020 (GB) ................................. 2003190

(51) Int. Cl.
*F16K 1/24* (2006.01)
*F16K 31/524* (2006.01)
*F16K 1/20* (2006.01)

(52) U.S. Cl.
CPC ............ *F16K 1/2007* (2013.01); *F16K 1/24* (2013.01); *F16K 31/52441* (2013.01)

(58) Field of Classification Search
CPC .... F16K 1/2007; F16K 31/52441; F16K 1/24; F16K 31/5282; F16K 31/521
See application file for complete search history.

(56) References Cited

U.S. PATENT DOCUMENTS

| 3,065,950 | A | 11/1962 | Goldberg |
| 4,817,916 | A | 4/1989 | Rawstron |
| 5,330,157 | A | 7/1994 | Dern et al. |

(Continued)

FOREIGN PATENT DOCUMENTS

| DE | 10 2011 008 629 A1 | 7/2012 |
| FR | 2642132 A1 * | 7/1990 |

OTHER PUBLICATIONS

Extended European Search report issued in EP Application No. 21275020.2 dated Aug. 13, 2021.
Search Report for GB2003190.2 dated Jul. 15, 2020.

*Primary Examiner* — Marina A Tietjen
(74) *Attorney, Agent, or Firm* — Foley & Lardner LLP

(57) ABSTRACT

The valve component comprises a valve member movable between an open position and a closed position. The valve component comprises a valve control mechanism including a drive member that moves the valve member. The drive member rotates the valve member between the open position and an intermediate position and linearly moves the valve member between the intermediate position and the closed position. The valve control mechanism includes a cam to drive the drive member. The cam includes a cam slot to engage the drive member. The cam slot includes a recess to receive the drive member in the closed position of the valve member so that the recess locates the drive member to resist or prevent linear movement of the valve member away from the valve closed position towards the valve intermediate position.

14 Claims, 26 Drawing Sheets

(56) References Cited

U.S. PATENT DOCUMENTS

| | | | |
|---|---|---|---|
| 8,042,569 B2* | 10/2011 | Morris | F16K 11/076 137/595 |
| 2016/0178066 A1 | 6/2016 | Shopland et al. | |
| 2018/0231130 A1* | 8/2018 | Soundararajan | F16K 31/1635 |
| 2018/0274683 A1 | 9/2018 | Suzuki et al. | |

* cited by examiner

VALVE COMPONENT

CROSS-REFERENCE TO RELATED PATENT APPLICATIONS

This application is a continuation of U.S. application Ser. No. 17/192,582, filed Mar. 4, 2021, which claims the benefit of and priority to UK Application No. GB 2003190.2, filed on Mar. 5, 2020, the entire disclosure of which is hereby incorporated by reference herein.

BACKGROUND

This invention relates to a valve component for a valve, a valve comprising the valve component and a fluid conduit comprising the valve.

It is known to use a valve to selectively open and close a hollow bore in a pipeline to control the flow of flowable material in the pipeline. Typically the valve includes a valve member that is releasably held in an open position to allow the flowable material to flow along the hollow bore and is biased to instantaneously close the hollow bore upon the valve member being released from its open position. The instantaneous closure of the hollow bore causes an instantaneous change in flow velocity of the flowable material in the hollow bore that increases the risk of occurrence of a surge pressure in the pipeline that could damage the pipeline and other components connected to the pipeline.

SUMMARY

According to a first aspect of the invention, there is provided a valve component for a valve, the valve comprising a valve housing defining a hollow bore along which flowable material may flow, the valve component including a valve member movable between a valve open position for the valve member to open the hollow bore, and a valve closed position for the valve member to close the hollow bore, and a valve control mechanism including a drive member configured to be operable to move the valve member between the valve open position and the valve closed position, the drive member operable to rotate the valve member between the valve open position and a valve intermediate position and to linearly move the valve member between the valve intermediate position and the valve closed position.

In use, the valve component forms part of a valve that is connected in a fluid conduit that is capable of transferring flowable material such as liquids and gases, particularly water, cryogenic fluids, liquid natural gas, petrochemicals and hydrocarbons. The invention is applicable to a wide range of fluid conduits such as, but not limited to, a pipeline, a manifold, a hose, a shut-off valve, a release coupling, a breakaway coupling and a section thereof. The fluid conduit may be rigid or flexible.

The valve member when at its valve open position opens the hollow bore in the valve housing to permit flowable material to flow along the hollow bore and therefore along the fluid conduit. The valve member when at its valve open position may be positioned at different angles relative to the cross-section of the hollow bore. Preferably the valve member when at its valve open position bisects the hollow bore to minimize resistance to the flow of the flowable material along the hollow bore.

In order to close the hollow bore, the drive member is operated to rotate the valve member from the valve open position to the valve intermediate position and then linearly move the valve member from the valve intermediate position to the valve closed position. Conversely, in order to open the hollow bore, the drive member is operated to linearly move the valve member from the valve closed position to the valve intermediate position and then rotate the valve member from the valve intermediate position to the valve open position.

The provision of the valve control mechanism in the valve component provides direct control over the operation of the valve member to close the hollow bore. In this manner the movement of the valve member can be actively controlled to provide a gradual closure of the hollow bore. This in turn causes a gradual change in flow velocity of the flowable material in the hollow bore and thereby minimizes the risk of occurrence of a surge pressure in the fluid conduit that could damage the fluid conduit and other components connected to the fluid conduit.

When the valve component is used in combination with a compressible seal to close and seal the hollow bore, the provision of the valve control mechanism in the valve component allows operation of the drive member to linearly move the valve member against the seal to further compress the seal. This is particularly useful in circumstances when the seal transitions from a hard state to a soft state whilst it is warming up, e.g. from cryogenic temperatures to atmospheric temperatures. In contrast, configuring the drive member to be operable to only rotate the valve member between the valve open position and the valve closed position might result in poor compression of the seal, thus resulting in an ineffectively sealed hollow bore.

The provision of the valve control mechanism in the valve component of the invention therefore results in a valve that not only provides improved closure of the hollow bore but also enhances the reliability and lifetime of the fluid conduit and other components connected to the fluid conduit.

The drive member may be controllable, e.g. by hand or machine, to move between the valve open position and the valve closed position. The machine may be or may include, but is not limited to, a hydraulic actuator, a pneumatic actuator, a motor or a gearbox.

In embodiments of the invention, the valve control mechanism may include a guide element for guiding the drive member during its operation to rotate the valve member between the valve open position and the valve intermediate position and to linearly move the valve member between the valve intermediate position and the valve closed position.

The provision of the guide element ensures proper operation of the drive member to move the valve member between the valve open position and the valve closed position, thus improving the reliability of the valve component.

In such embodiments, the guide element may include a guide slot. The guide slot is suitably shaped to guide the drive member during its operation to move the valve member between the valve open position and the valve closed position. For example, the guide slot may include first and second guide slot portions, the first guide slot portion shaped to define an arcuate guide slot portion, the second guide slot portion shaped to define a linear guide slot portion.

In further embodiments of the invention, the valve control mechanism may include a cam to drive the drive member.

The interaction of the cam and drive member permits a rotary motion applied to the cam to be converted by the cam into a combination of rotary and linear motion that is required to move the valve member between the valve open position and the valve closed position. This thereby enables operation of the drive member solely through application of rotary motion to the cam, thus simplifying the operation of the valve component.

In order for the cam to drive the drive member, the manner in which the cam engages the drive member may vary. For example, the cam may include a cam slot to engage the drive member.

The provision of the guide and cam slots in the valve component allows the valve member to be securely held in the valve open position during the flow of flowable material through the hollow bore. More specifically, the interaction of the drive member with the guide and cam slots enables the cam to be held stationary in order to securely hold the valve member in the valve open position whilst flowable material flowing in the hollow bore continuously pushes against the valve member. Omission of either the guide or cam slots from the valve component would allow the flowable material flowing in the hollow bore to push against the valve member to force the valve member from the valve open position to the valve closed position.

In embodiments of the invention, the cam slot may include a recess arranged to receive the drive member in the valve closed position of the valve member so that the recess locates the drive member to resist or prevent linear movement of the valve member away from the valve closed position towards the valve intermediate position.

The inclusion of the recess in the cam slot provides the valve component with a passive self-locking means of securely holding the valve member in the valve closed position, even when flowable material is flowing through the hollow bore. This not only improves the closure of the hollow bore but also removes the need to maintain the application of a torque to the cam, either by hand or machine, in order to keep the valve member in the valve closed position, thus providing labour and equipment savings.

Preferably the cam slot is shaped to define an arcuate cam slot or a crescent-shaped cam slot.

In embodiments of the invention employing the use of a cam, the valve component may include a retention device. The retention device may include an engagement member arranged to engage the cam in the valve open position of the valve member so that the engagement member locates the cam to resist or prevent rotation of the valve member away from the valve open position towards the valve intermediate position.

The inclusion of the retention device provides the valve component with a passive self-locking means of securely holding the valve member in the valve open position, even when flowable material is flowing through the hollow bore. This not only improves the opening of the hollow bore but also removes the need to maintain the application of a torque to the cam, either by hand or machine, in order to keep the valve member in the valve open position, thus providing labour and equipment savings.

In such embodiments, the cam slot may include a recess arranged to receive the drive member in the valve open position of the valve member. This allows the cam slot to locate the drive member in order to more securely hold the valve member in the valve open position.

In further such embodiments, the retention device may include a first biasing member configured to apply a biasing force to the engagement member so that the engagement member is urged to engage the cam in the valve open position of the valve member. This further strengthens the ability of the retention device to securely hold the valve member in the valve open position.

The first biasing member may be a resilient biasing member, such as a spring, to allow the engagement member to more easily disengage the cam when a torque is applied to the cam to move the valve member away from the valve open position.

In embodiments of the invention employing the use of a cam, the valve control mechanism may include a projecting member operable to rotate the cam. The projecting member may extend through a valve member slot in the valve member. The valve member slot may be shaped to define a linear valve member slot. The projecting member may be, but is not limited to, an axle, shaft or rod. The projecting member may be operably connected to, or form part of, an actuator that is controllable by hand or machine.

The configuration of the projecting member and the valve member in this manner allows the valve member to pivot about the projecting member when rotating between the valve open position and the valve intermediate position and to linearly move relative to the projecting member when linearly moving between the valve intermediate position and the valve closed position. This therefore enables a compact arrangement of the valve component without hindering the operation of the drive member to move the valve member between the valve open position and the valve closed position.

In further embodiments of the invention, the valve member may include a closure portion for closing the hollow bore, the valve member further including a second biasing member configured to apply a biasing force to the closure portion so that the closure portion is urged to close the hollow bore in the valve closed position of the valve member. The biasing force applied by the second biasing member to the closure portion acts as a preload to help the closure portion close the hollow bore, especially at low pressures inside the fluid conduit.

In such embodiments, the valve member may include first and second valve member portions. The first valve member portion may be operably mounted onto a base of the valve component. The second valve member portion may be configured as the closure portion. The second valve member portion may be operably mounted on the first valve member portion to permit movement of the second valve member portion relative to the first valve member portion.

When the valve member is in the valve closed position to close the hollow bore, pressure may build up in the fluid conduit. For example, build-up of pressure in the fluid conduit may take place during a purging process of the fluid conduit. This could damage the valve member that is closing the hollow bore. Permitting movement of the second valve member portion relative to the first valve member portion provides the closure portion with a movement range that allows a limited opening of the hollow bore to release pressure and allows full reclosure of the hollow bore after the pressure in the fluid conduit has dropped to a safe level.

Optionally the second biasing member may be arranged between the first and second valve member portions. Further optionally the second biasing member may be housed inside an internal cavity formed between the first and second valve member portions. This results in a compact and secure arrangement of the second biasing member in the valve member that not only does not restrict the movement of the valve member between the valve open position and the valve closed position but also protects the second biasing member from being damaged by the movement of the valve member and/or by the flow of flowable material through the hollow bore.

In embodiments of the invention employing the use of a second biasing member, the second biasing member may be compressible, such as a spring. In such embodiments, the second biasing member may be a disc spring, such as a Belleville washer.

The provision of a compressible second biasing member enables energisation of the second biasing member to provide the biasing force to the closure portion and/or enables the movement of the second valve member portion relative to the first valve member portion.

The configuration of the valve member may vary to enable it to close the hollow bore of the valve housing. For example, the valve member may include a flap or disc closure portion for closing the hollow bore. The use of a flap or disc closure portion advantageously minimizes the resistance to the flow of the flowable material along the hollow bore when the valve member is at its valve open position whilst retaining its capability to fully close the hollow bore when the valve member is at its valve closed position.

The dimensions of the closure portion of the valve member may vary depending on the specifications of the associated fluid conduit. Preferably the closure portion of the valve member has a diameter of 4, 6, 8, 10 or 12 inches.

Preferably the drive member is configured to be operable to vary the speed at which the valve member is rotated between the valve open position and the valve intermediate position and/or to vary the speed at which the valve member is linearly moved between the valve intermediate position and the valve closed position.

The provision of the valve control mechanism in the valve component is advantageous in that the drive member enables direct control over the speed at which the valve member is rotated between the valve open position and the valve intermediate position and/or the speed at which the valve member is linearly moved between the valve intermediate position and the valve closed position. The speed at which the valve member moves from the valve open position to the valve closed position to provide a gradual closure of the hollow bore depends on the type of flowable material flowing in the hollow bore and its flow rate. In addition, when the valve component is used in combination with a compressible seal to close and seal the hollow bore, the speed at which the valve member is linearly moved between the valve intermediate position and the valve closed position may be varied to correspond to the rate of transition of the seal from its hard state to its soft state, so as to ensure maximum compressibility of the seal and thereby facilitate enhanced sealing of the hollow bore.

In embodiments of the invention, the valve member may include a first seal for sealingly engaging the valve housing when the valve member is in its valve closed position.

The first seal may be a compressible seal. The configuration of the valve component enables improved compression of the first seal and thereby facilities enhanced sealing of the hollow bore by the valve member.

In other embodiments of the invention, the first seal may be a non-compressible seal.

According to a second aspect of the invention, there is provided a valve including a valve housing defining a hollow bore along which flowable material may flow, and a valve component according to any one of the first aspect of the invention and its embodiments described hereinabove, wherein the valve component is located inside the valve housing.

The features and advantages of the valve component of the first aspect of the invention and its embodiments apply mutatis mutandis to the features and advantages of the valve of the second aspect of the invention and its embodiments.

The valve may be a bidirectional or unidirectional valve.

The valve housing may include a second seal for sealingly engaging the valve member when it is at the valve closed position.

The second seal may be a compressible seal. The configuration of the valve component enables improved compression of the second seal and thereby facilities enhanced sealing of the hollow bore by the valve member.

In other embodiments of the invention, the second seal may be a non-compressible seal.

According to a third aspect of the invention, there is provided a fluid conduit comprising a valve according to any one of the second aspect of the invention and its embodiments described hereinabove.

The features and advantages of the valve of the second aspect of the invention and its embodiments apply mutatis mutandis to the features and advantages of the fluid conduit of the third aspect of the invention and its embodiments.

It will be appreciated that the use of the terms "first" and "second", and the like, in this patent specification is merely intended to help distinguish between similar features (e.g. the first and second guide slot portions, the first and second biasing members, the first and second valve member portions, the first and second seals, etc.), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

This summary is illustrative only and is not intended to be in any way limiting.

BRIEF DESCRIPTION OF THE FIGURES

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1A:
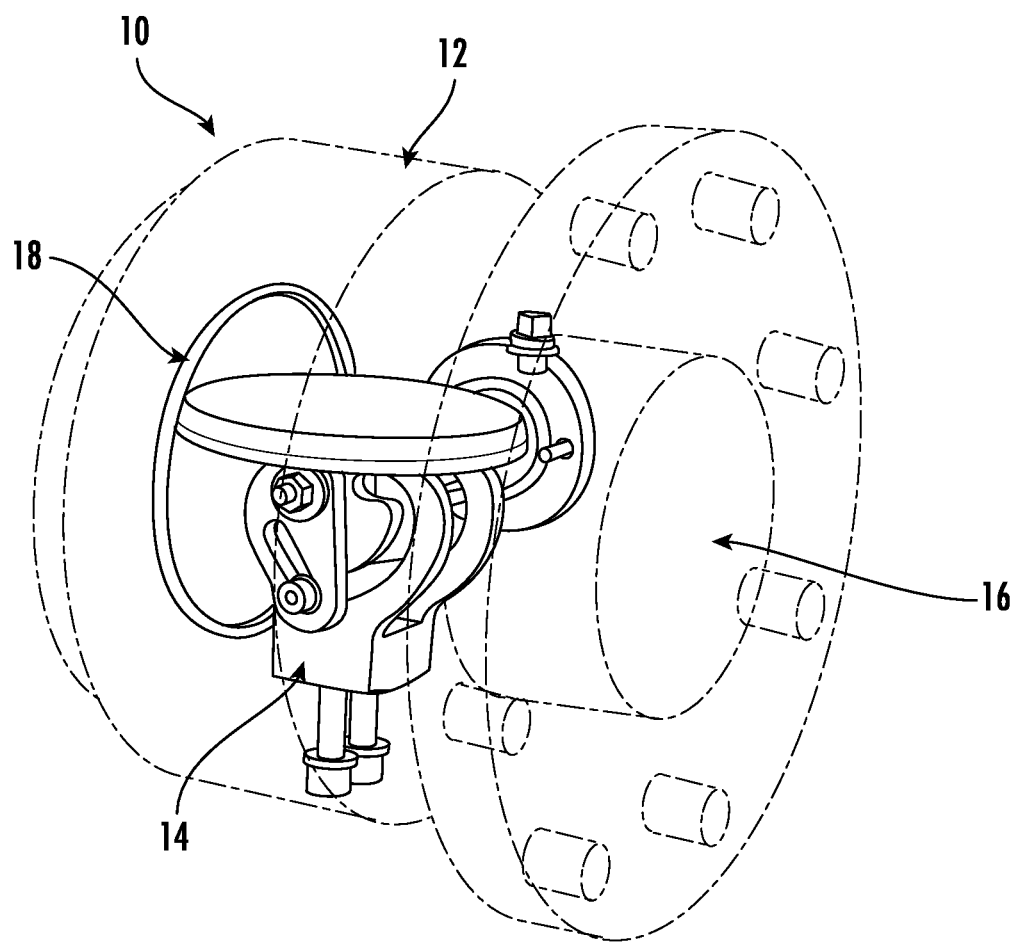
FIGS. 1a to 1c show a valve according to a first embodiment of the invention.
Figure 1B:
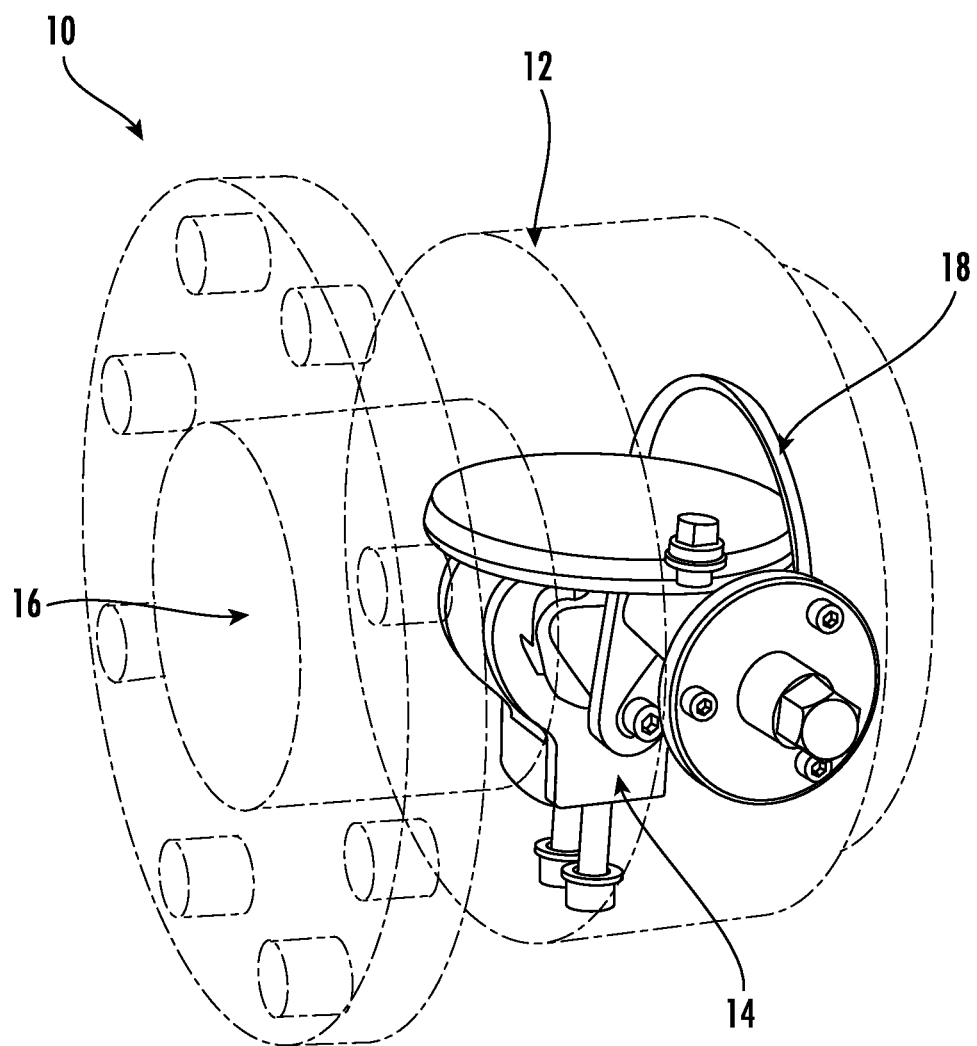
Figure 1C:
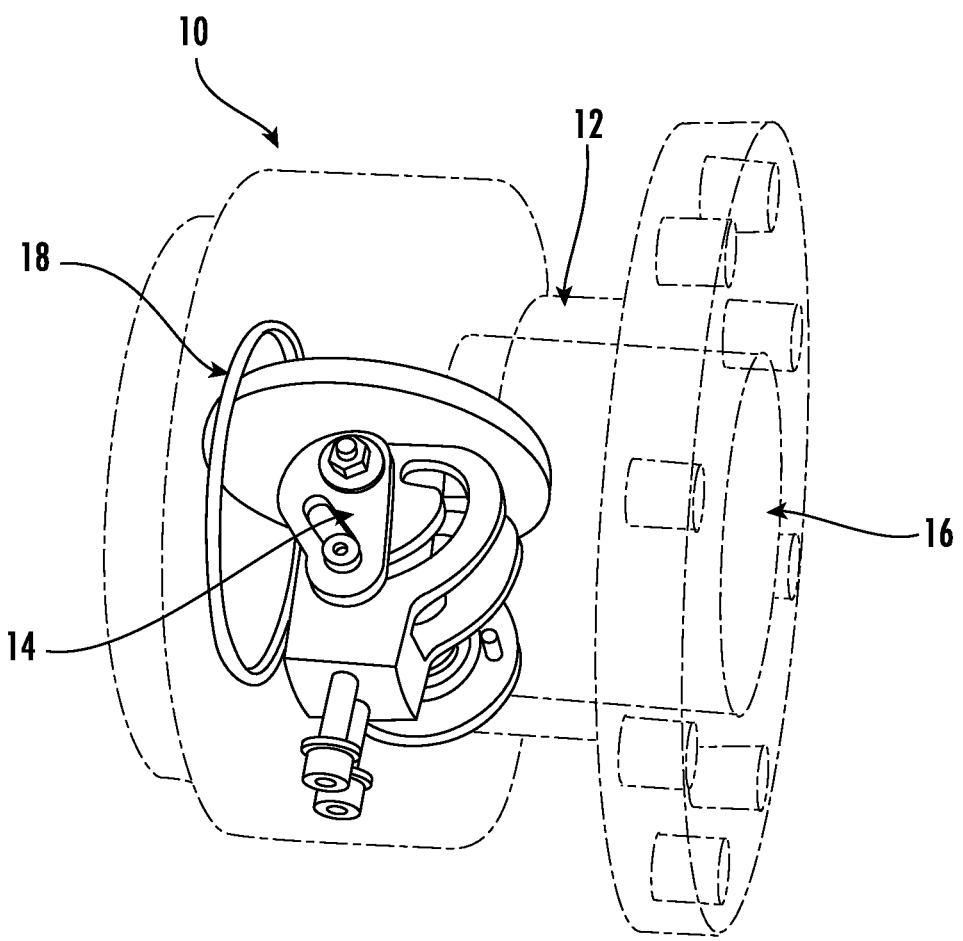
Figure 2:
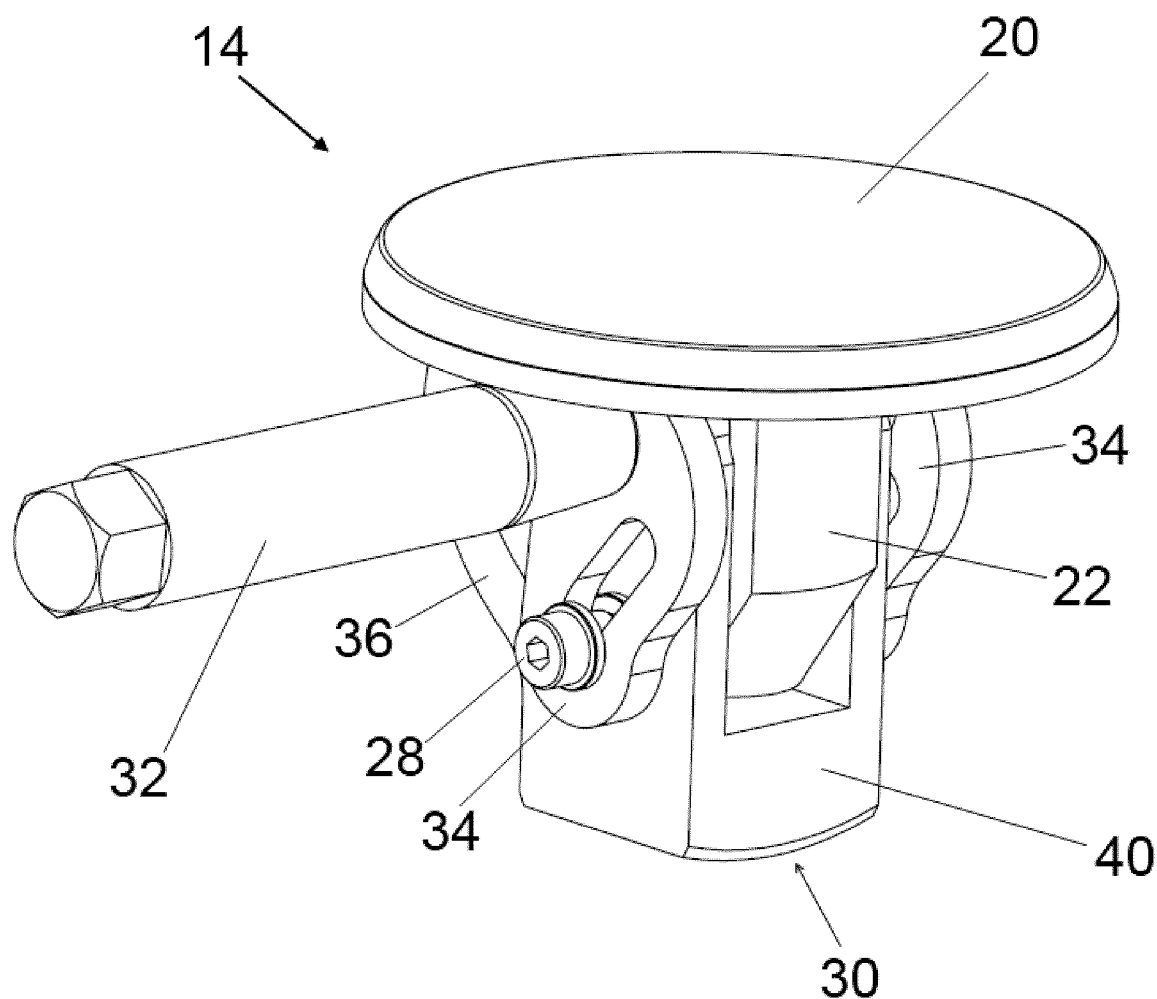
FIG. 2 shows a valve component forming part of the valve of FIGS. 1a to 1c.
Figure 3:
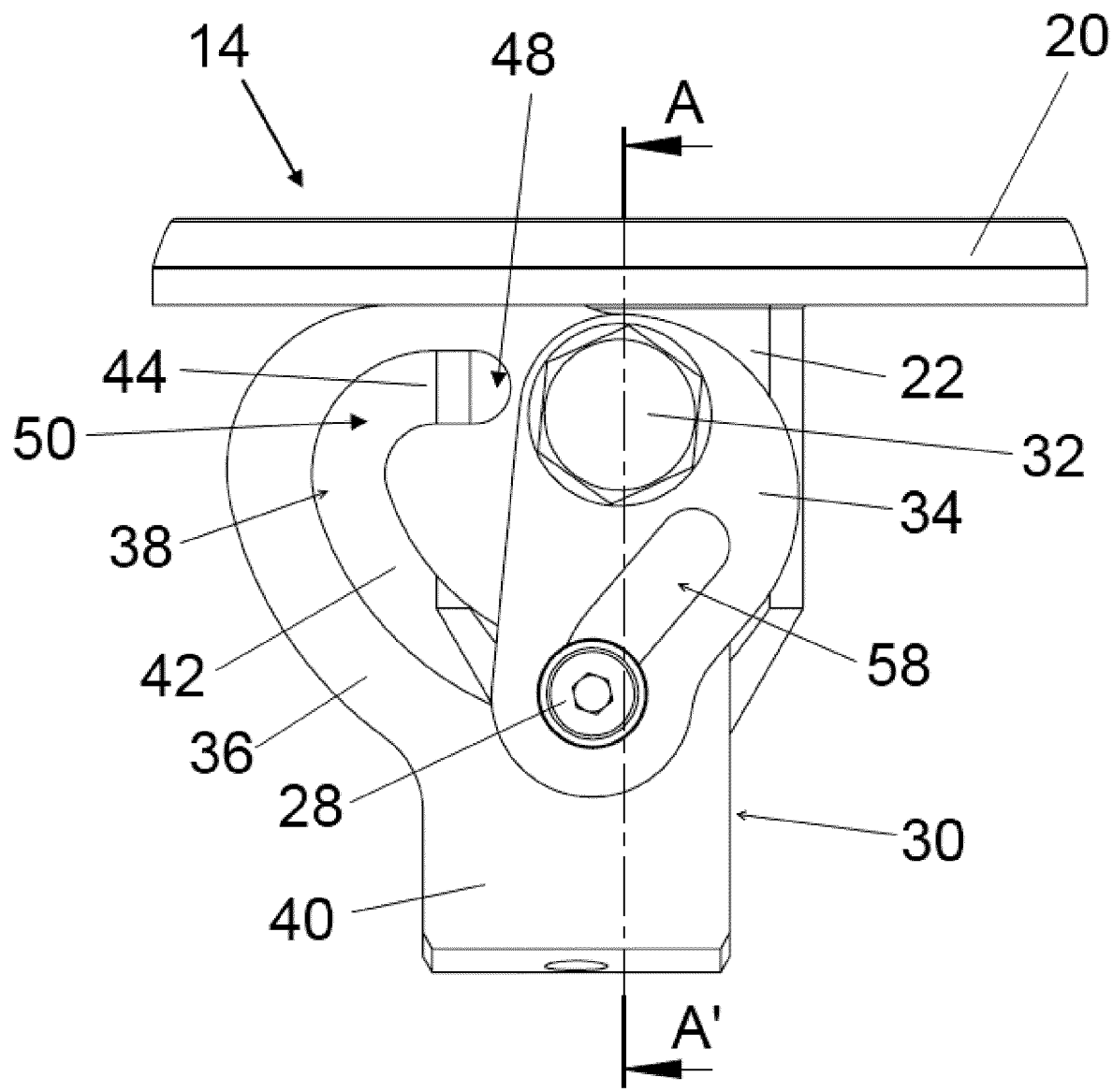
FIG. 3 shows a side view of the valve component of FIG. 2.
Figure 4:
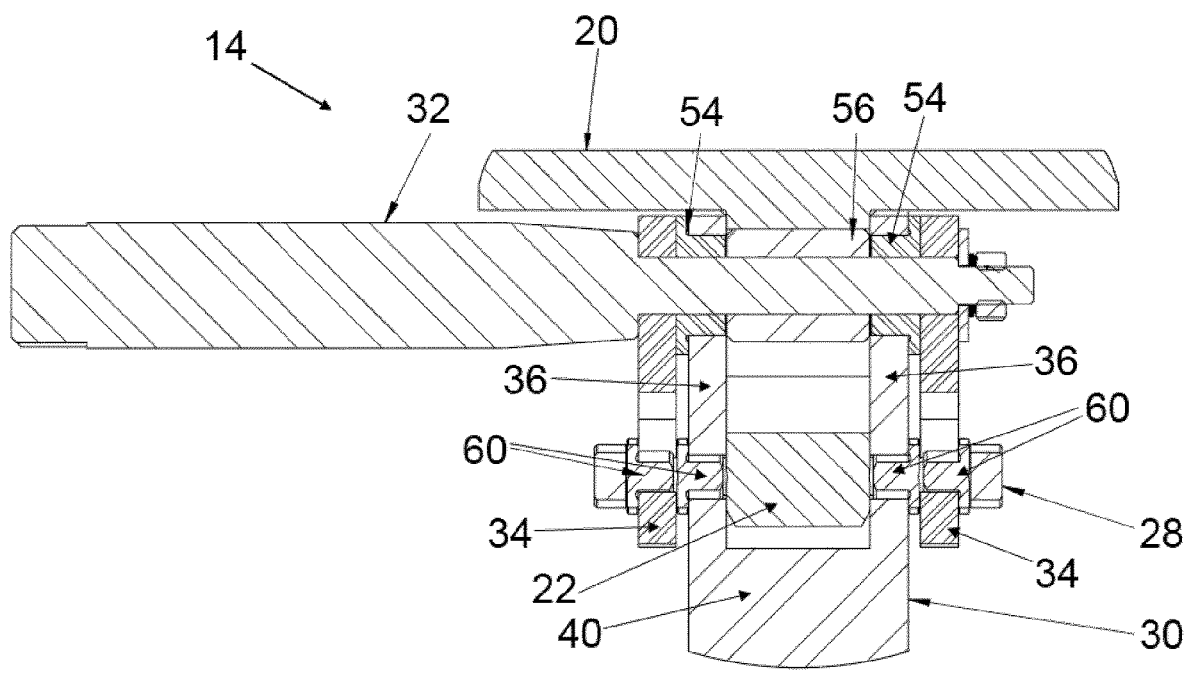
FIG. 4 shows a cross-sectional view along section A-A' of the valve component of FIG. 3.
Figure 5:
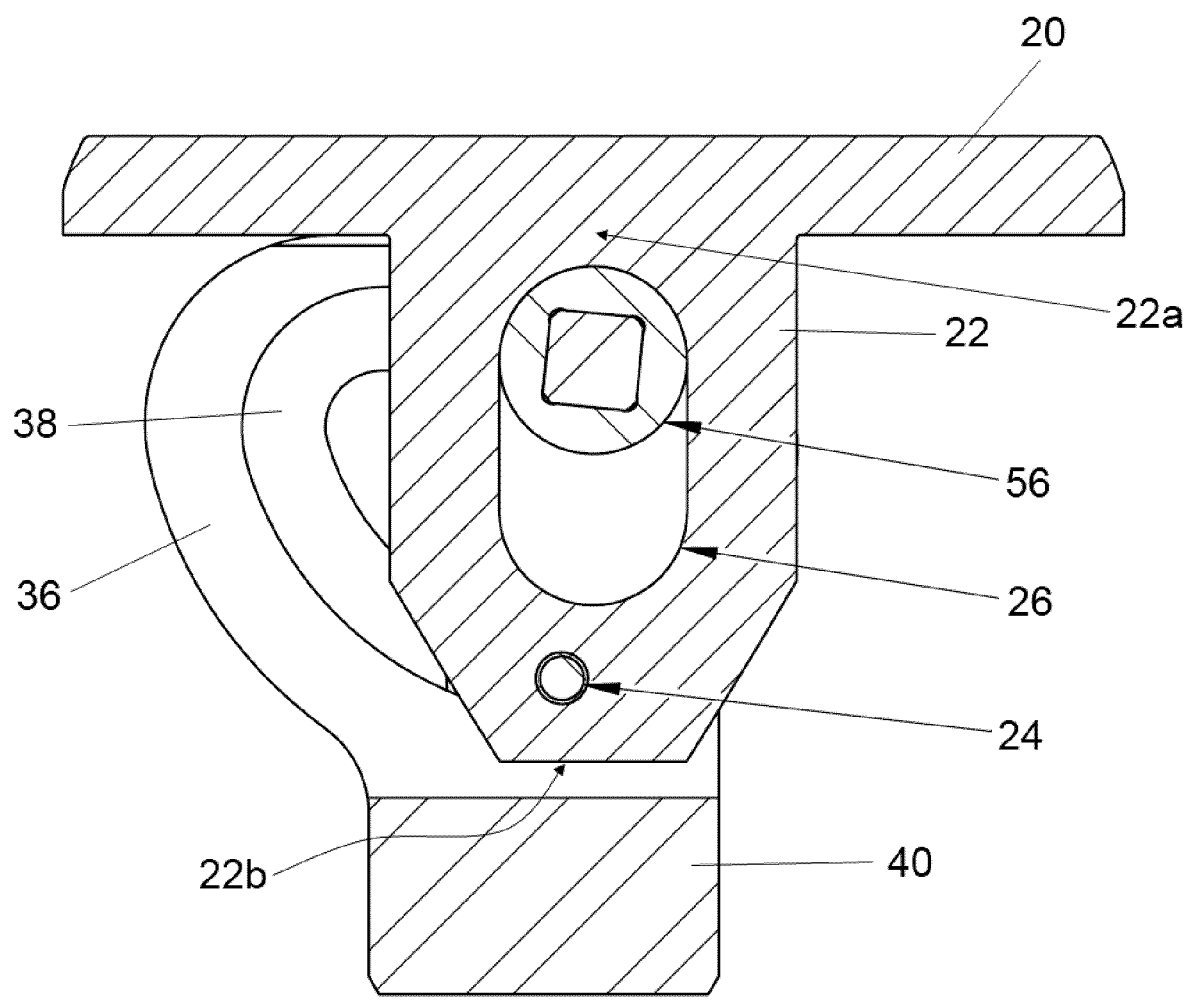
FIG. 5 shows a section view of a valve member forming part of the valve component of FIG. 2.
Figure 6:
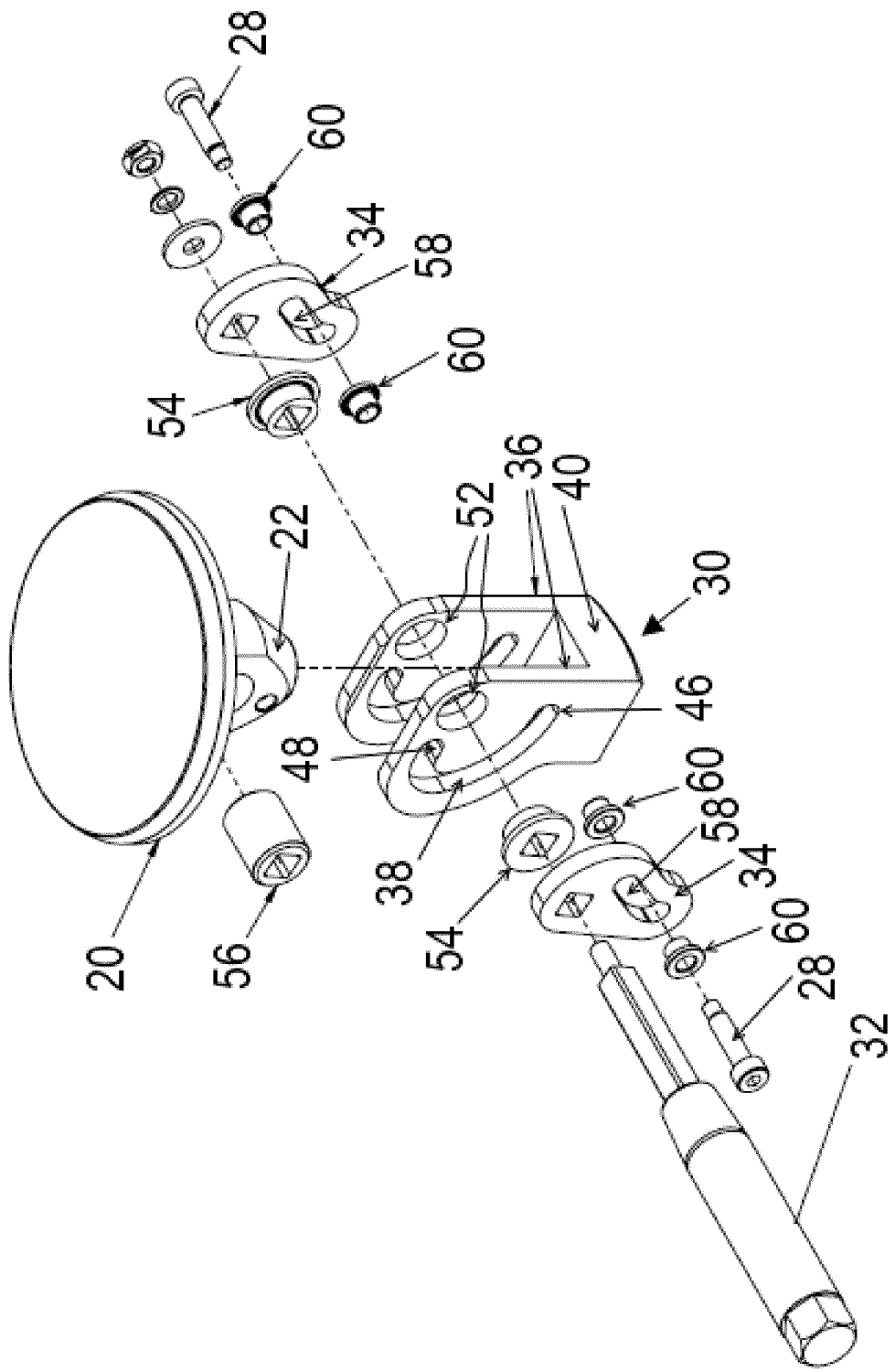
FIG. 6 shows an exploded view of the valve component of FIG. 2.

A valve according to a first embodiment of the invention is shown in FIGS. 1a to 1c and is designated generally by the reference numeral 10.

The valve 10 is a bidirectional valve. The valve 10 includes a valve housing 12 and a valve component 14.

The valve housing 12 defines a hollow bore 16 along which flowable material may flow in both directions. The valve component 14 is received inside the hollow bore 16 of the valve housing 12. The valve housing 12 further includes a compressible seal 18 that extends around the circumference of a longitudinal section of the hollow bore 16. The seal may be a tapered seal or a flat seal.

In use, the valve housing 12 is connected to a pipeline (not shown) so that the hollow bore 16 of the valve housing 12 is continuous with a hollow bore of the pipeline.

The structure of the valve component 14 is shown in FIGS. 2 to 6.

The valve component 14 includes a valve member and a valve control mechanism.

The valve member includes a flap portion 20 that is shaped in the form of a disc. The diameter of the flap portion 20 is sized so that the flap portion 20 is capable of sealingly engaging with the seal 18 to close the hollow bore 16 of the valve housing 12. Preferably the diameter of the flap portion 20 is 4, 6, 8, 10 or 12 inches.

The valve member further includes a stem portion 22 that projects perpendicularly from a circular surface of the flap portion 20. The stem portion 22 includes proximal and distal ends 22a, 22b. The proximal end 22a defines the point of attachment between the stem portion 22 and the flap portion 20. The distal end 22b defines the furthest point of the stem portion 22 away from the flap portion 20. The stem portion 22 includes an internally threaded aperture 24 located near the distal end 22b of the stem portion 22. The stem portion 22 further includes a valve member slot 26 that extends along the stem portion 22 between the aperture and the proximal end 22a of the stem portion 22. The valve member slot 26 is shaped to define a linear slot.

The valve control mechanism includes a pair of drive members 28, a guide element 30, a projecting member 32 and a pair of cams 34. The projecting member 32 is in the form of a shaft but may be an axle or rod in other embodiments.

Each drive member 28 is in the form of a shoulder bolt that is screwed into the internal thread of the threaded aperture 24 of the stem portion 22.

The guide element 30 is in the form of a mounting bracket 30 that includes a pair of opposing walls 36, each of which includes a guide slot 38. The mounting bracket 30 further includes a base 40 that interconnects the pair of opposing walls 36 and is secured to a wall of the valve housing 12.

The valve member, drive members 28 and guide element 30 are arranged so that the stem portion 22 of the valve member is located between the pair of opposing walls 36, and each drive member 28 extends through the guide slot 38 of the respective opposing wall 36.

The guide slot 38 in each opposing wall 36 includes first and second guide slot portions 42, 44. The first guide slot portion 42 is shaped to define a one-quarter arcuate guide slot portion. The second guide slot portion 44 is shaped to define a linear guide slot portion. Each guide slot portion 42, 44 includes first and second ends. For each guide slot 38, the first end of the first guide slot portion 42 defines a first terminating end 46 of the guide slot 38, the second end of the guide slot portion defines a second terminating end 48 of the guide slot 38, and the second end of the first guide slot portion 42 is continuously connected to the first end of the second guide slot portion 44 to define a point of connection 50 between the second end of the first guide slot portion 42 and the first end of the second guide slot portion 44.

Each opposing wall 36 further includes a pivot aperture 52. The shaft 32 not only extends through the pivot apertures 52 and through pivot bushes 54 respectively mounted in the pivot apertures 52, but also extends through a tubular pivot sleeve 56 that is located between the two pivot apertures 52. The pivot sleeve 56 extends through the valve member slot 26 in the stem portion 22 of the valve member. The pivot sleeve 56 is sized and shaped so that the valve member is rotatable about the pivot sleeve 56 and so that the pivot sleeve 56 is linearly movable along the length of the valve member slot 26.

The relative positions of the first guide slot portion 42 and pivot aperture 52 in each opposing wall 36 are arranged so that the movement of the drive member 28 along the first guide slot portion 42 causes rotation of the valve member about the pivot sleeve 56. In this manner the valve member is pivotally mounted onto the mounting bracket 30.

The relative positions of the second guide slot portion 44 and pivot aperture 52 in each opposing wall 36 are arranged so that the movement of the drive member 28 along the second guide slot portion 44 causes linear movement of the valve member relative to the pivot sleeve 56 and towards the seal 18.

Each cam 34 is in the form of a cam plate and is mounted onto the shaft 32 so that each cam 34 flanks an outer wall of a respective one of the opposing walls 36 of the mounting bracket 30. The mounting of each cam 34 onto the shaft 32 allows each cam 34 to be rotated when the shaft 32 is rotated in use.

Each cam 34 includes a cam slot 58 through which the respective drive member 28 extends. Each drive member 28 further extends through a cam bush 60 mounted in the corresponding cam slot 58 and a cam bush 60 mounted in the corresponding guide slot 38. The cam slot 58 of each cam 34 is shaped so that the rotation of the corresponding cam 34 drives the corresponding drive member 28 to move back and forth along the corresponding guide slot 38 between its terminating ends 46,48. The interaction of the cams 34 and drive members 28 in this manner permits a rotary motion applied to the shaft 32 to be converted by the cams 34 into a combination of rotary and linear motion that is required to drive each drive member 28 along the corresponding guide slot 38.

The shaft 32 further extends through a wall of the valve housing 12 so that it can be externally rotated from the exterior of the valve housing 12. The shaft 32 may be rotated by hand or machine.

Figure 7:
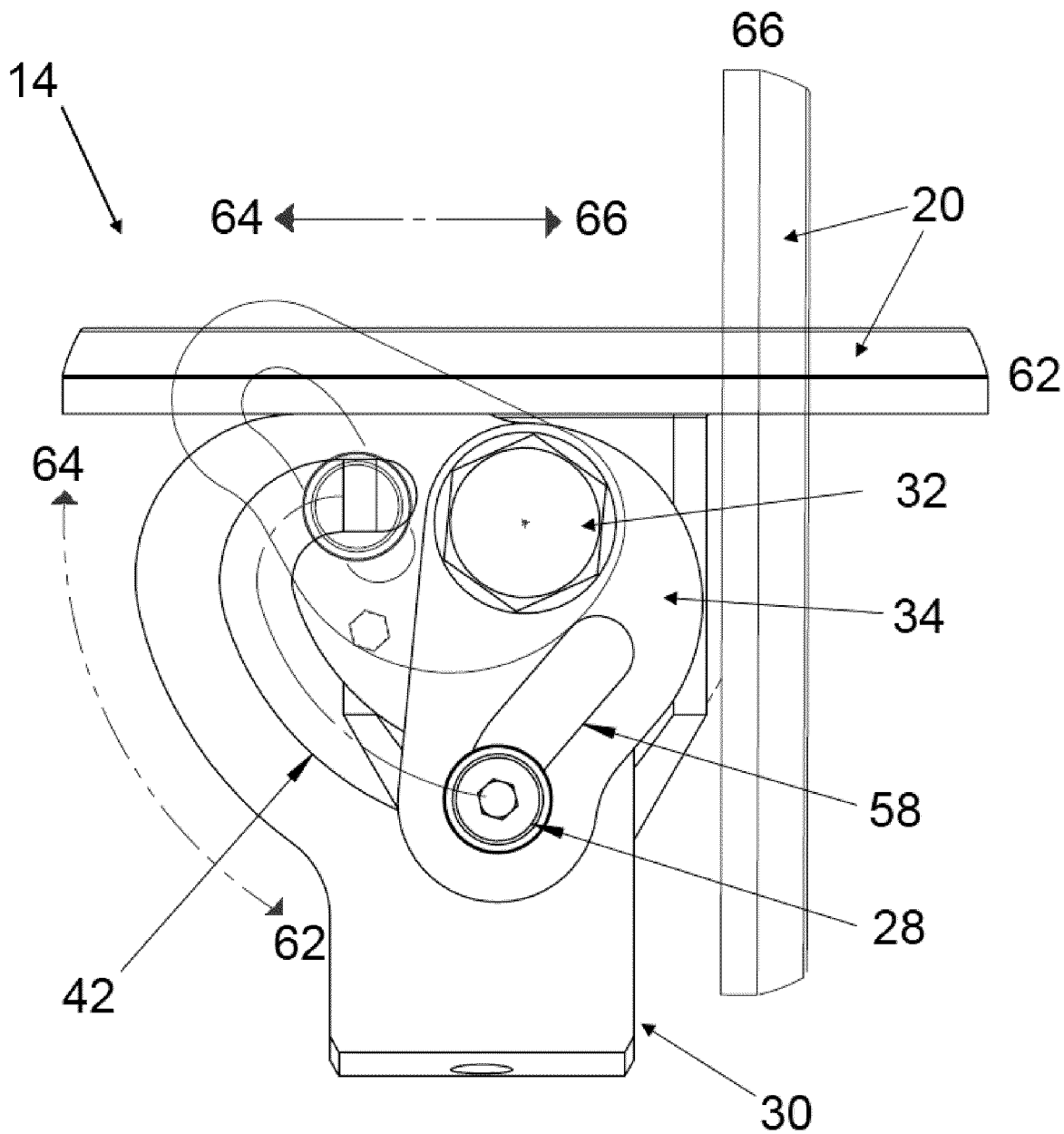
FIG. 7 illustrates the operation of the valve component of FIG. 2.
Figure 8A:
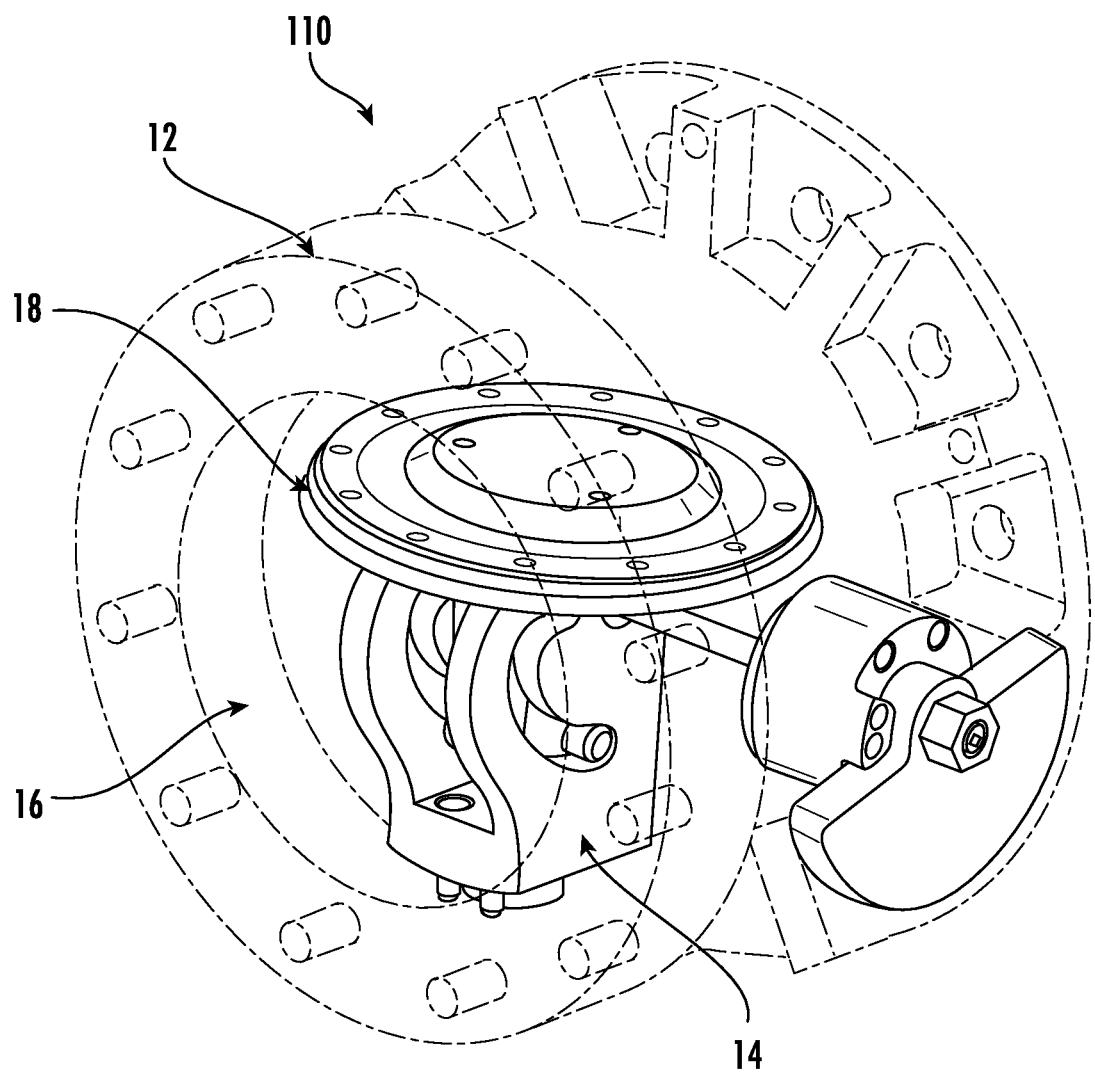
FIGS. 8a to 8f show a valve according to a second embodiment of the invention.
Figure 8B:
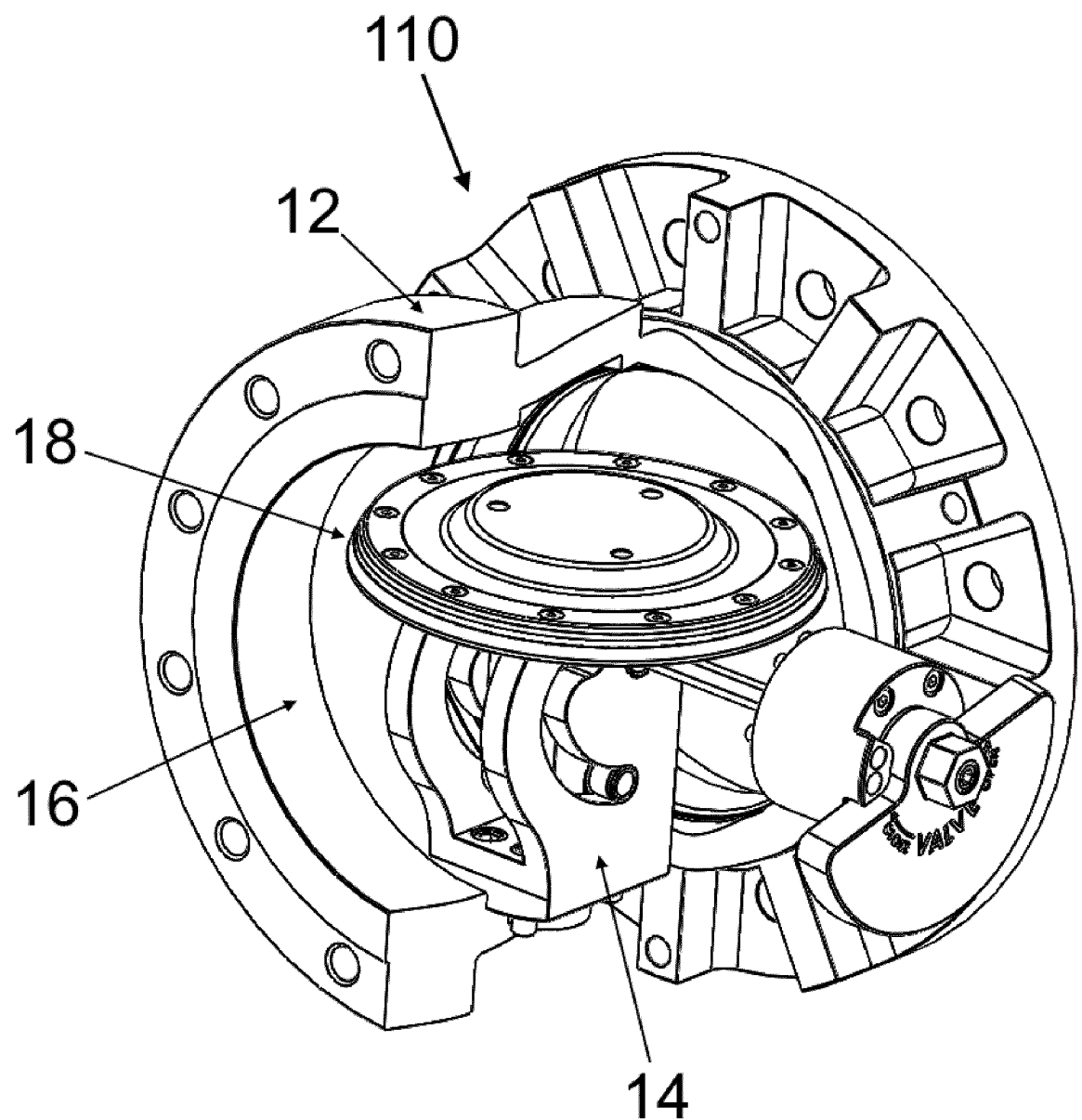
Figure 8C:
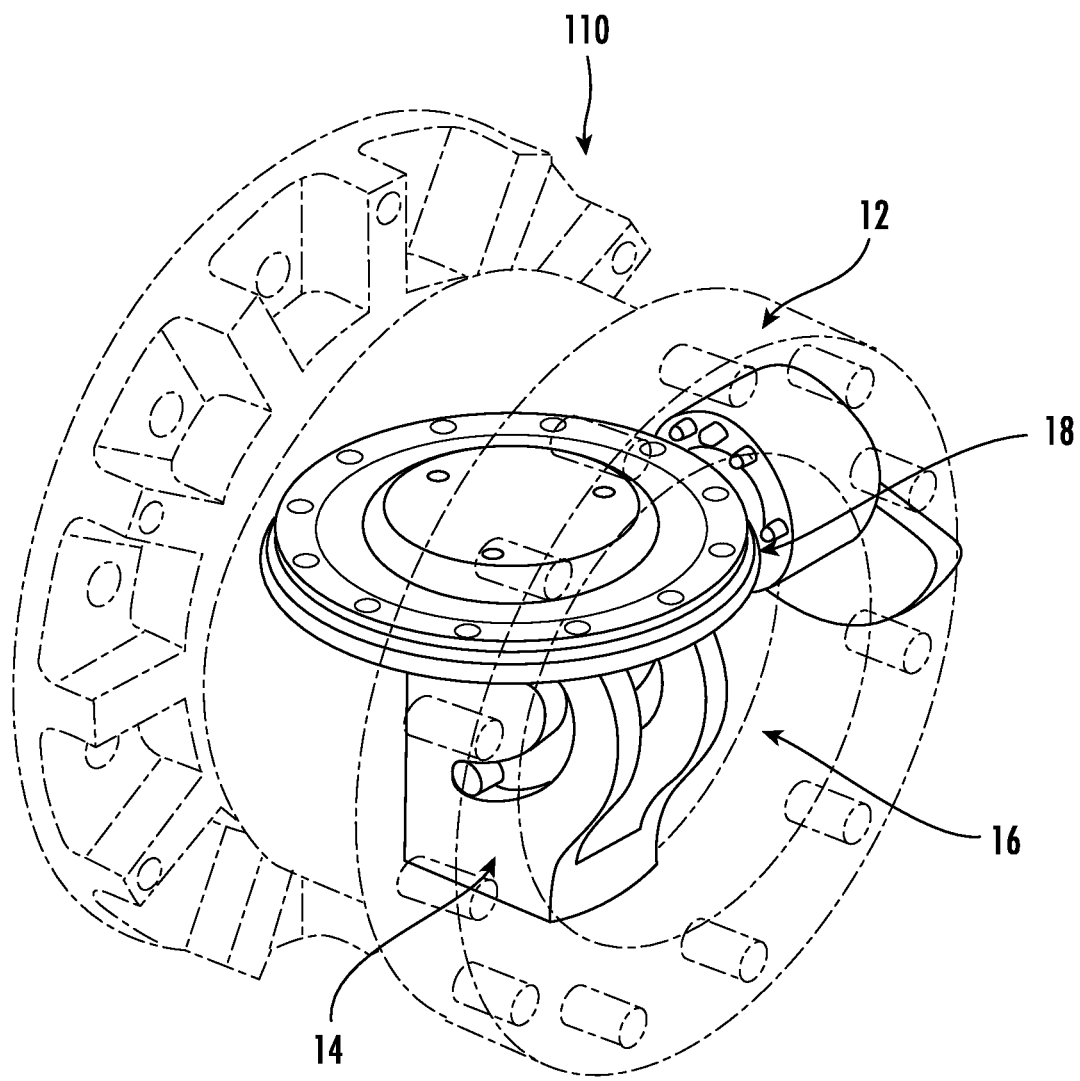
Figure 8D:
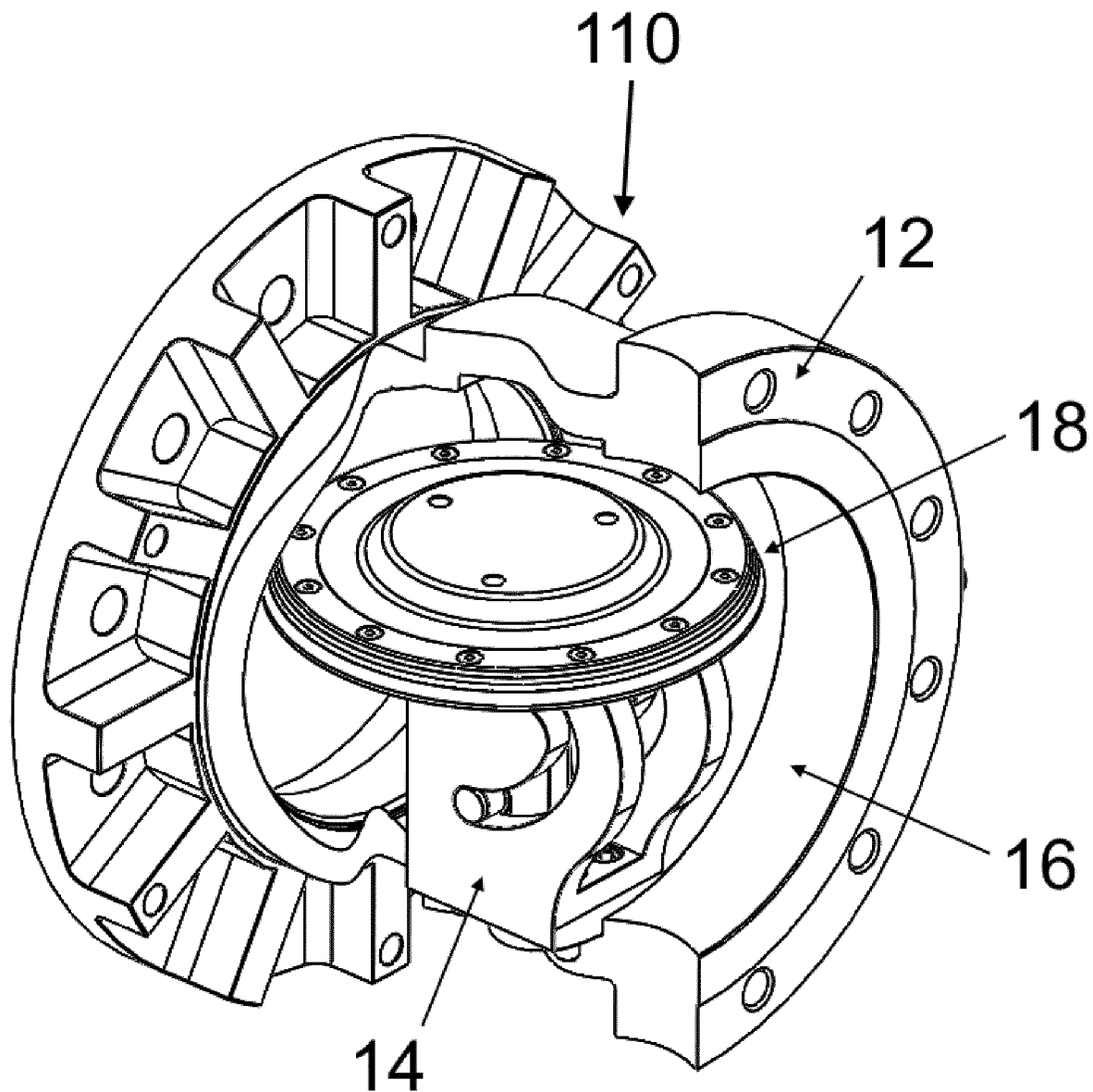
Figure 8E:
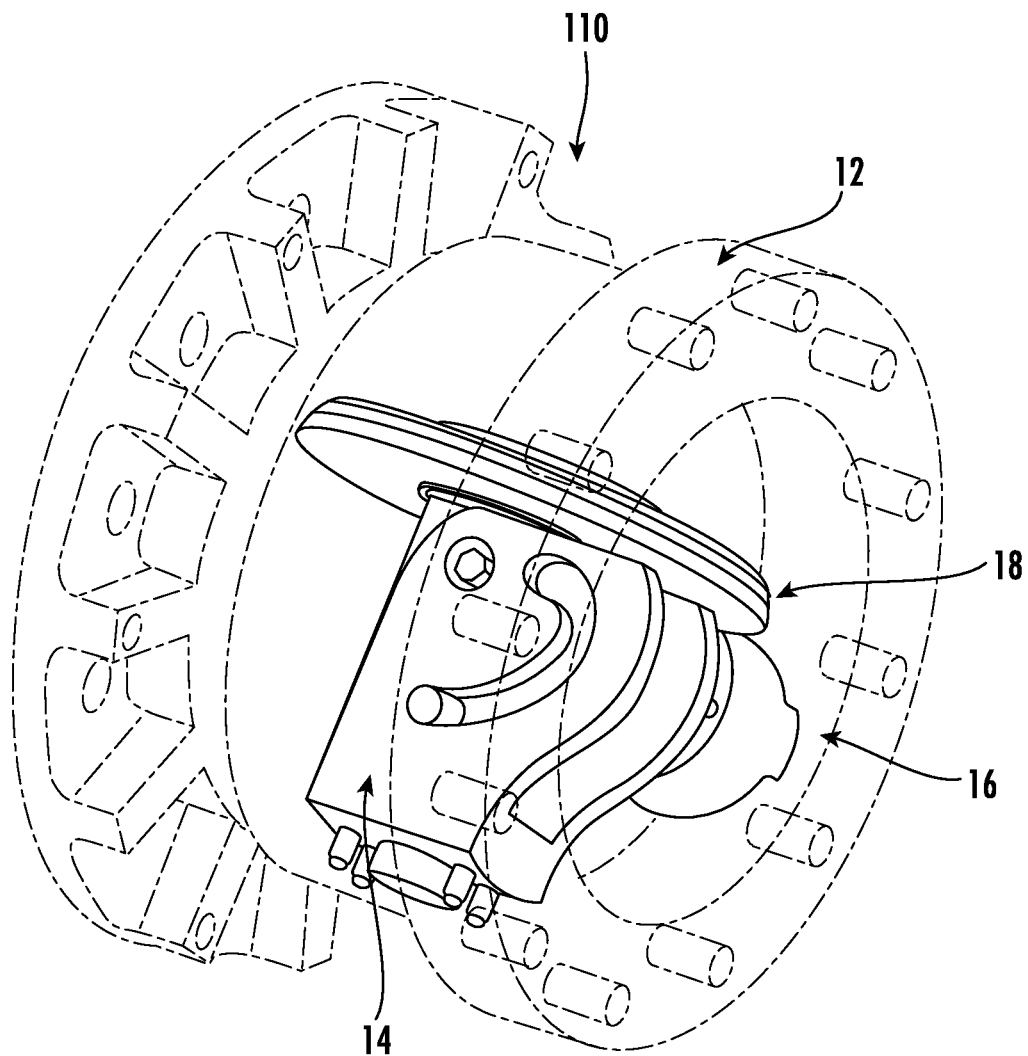
Figure 8F:
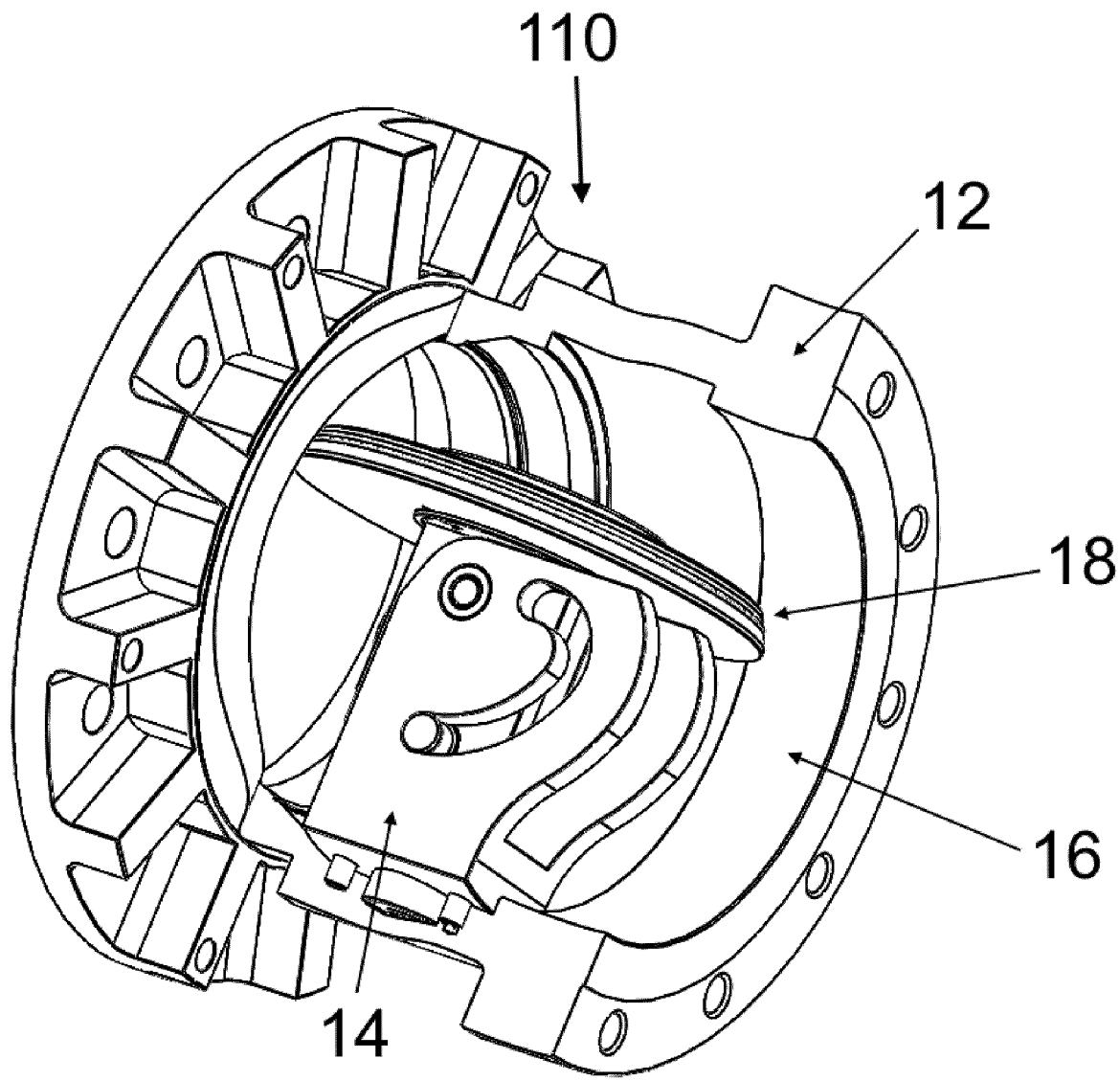
Figure 9:
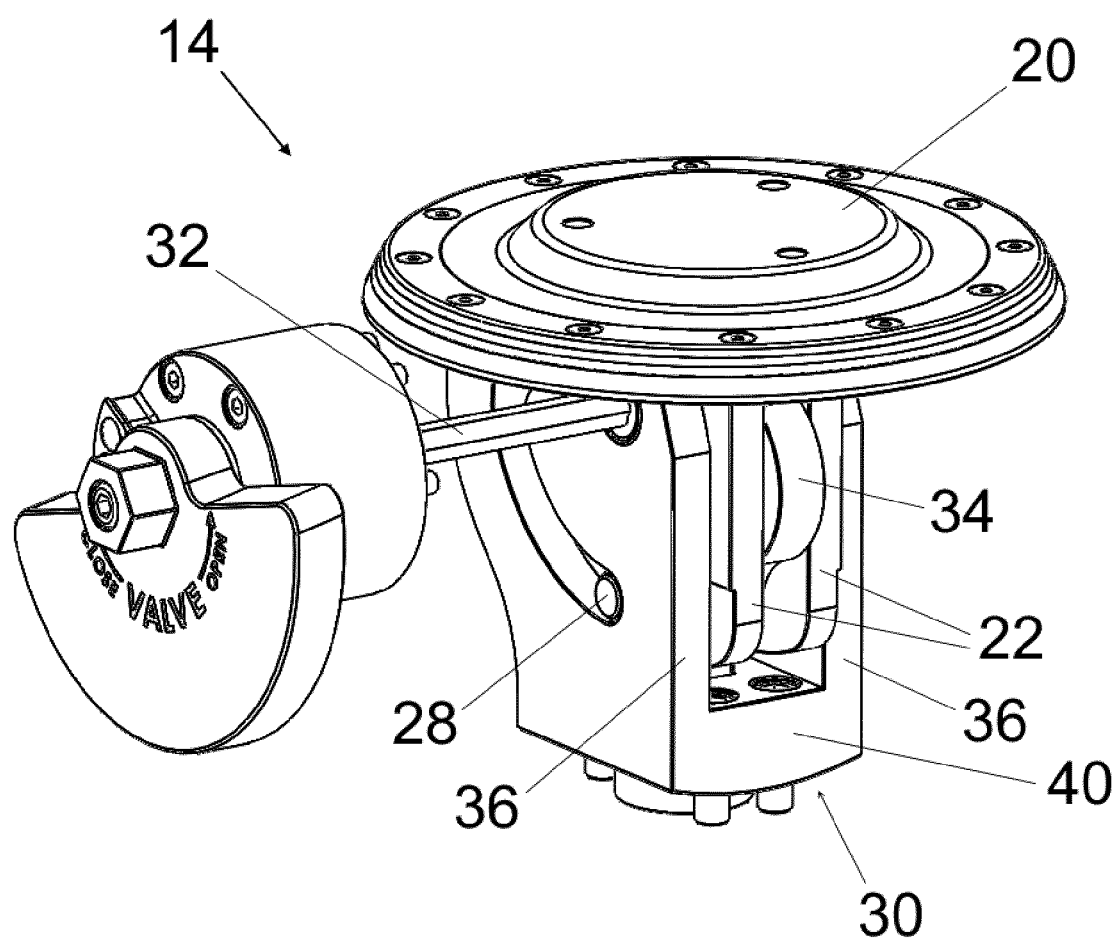
FIG. 9 shows a valve component forming part of the valve of FIGS. 8a to 8f.
Figure 10A:
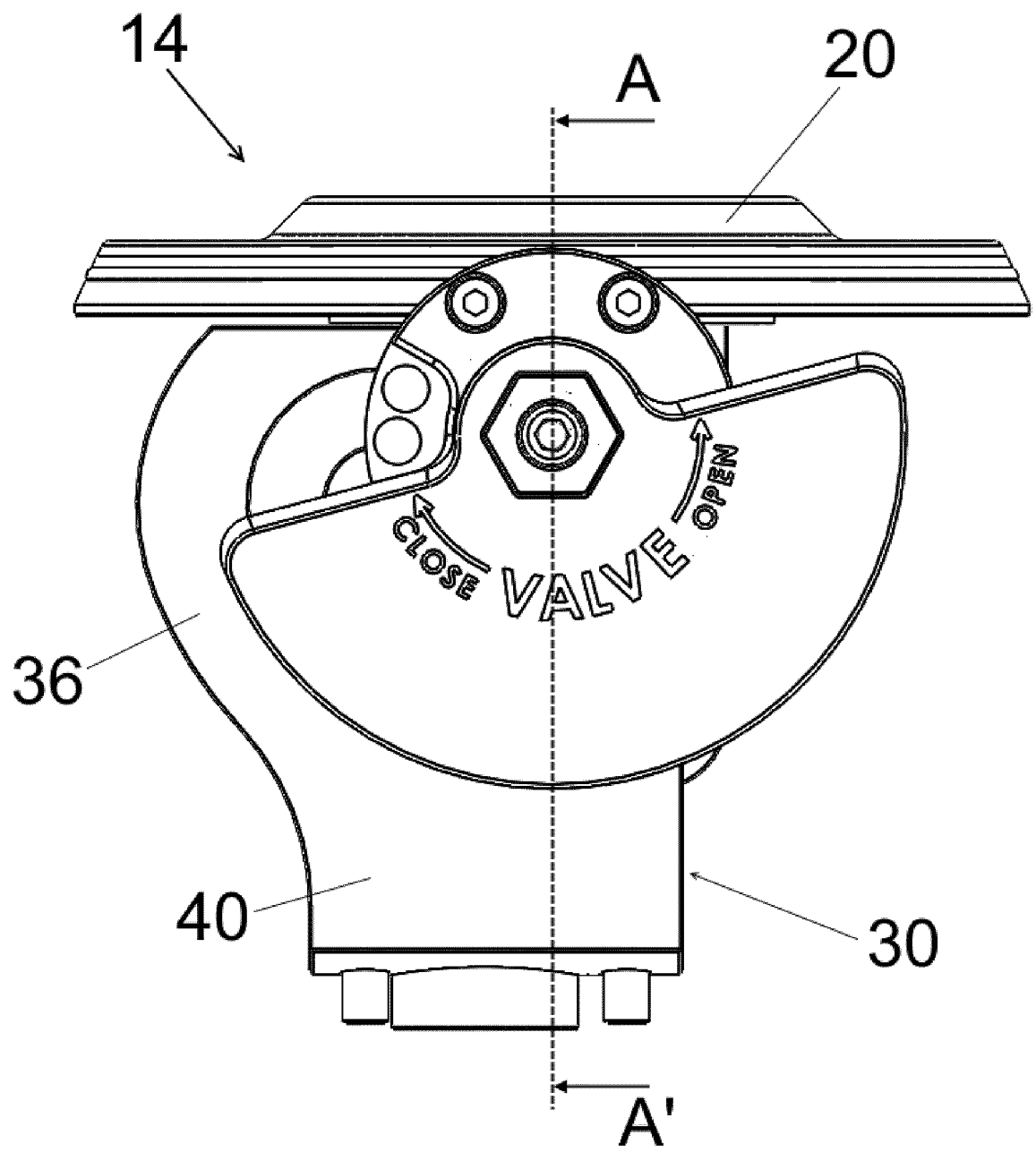
FIGS. 10a to 10c shows side views of the valve component of FIG. 9.
Figure 10B:
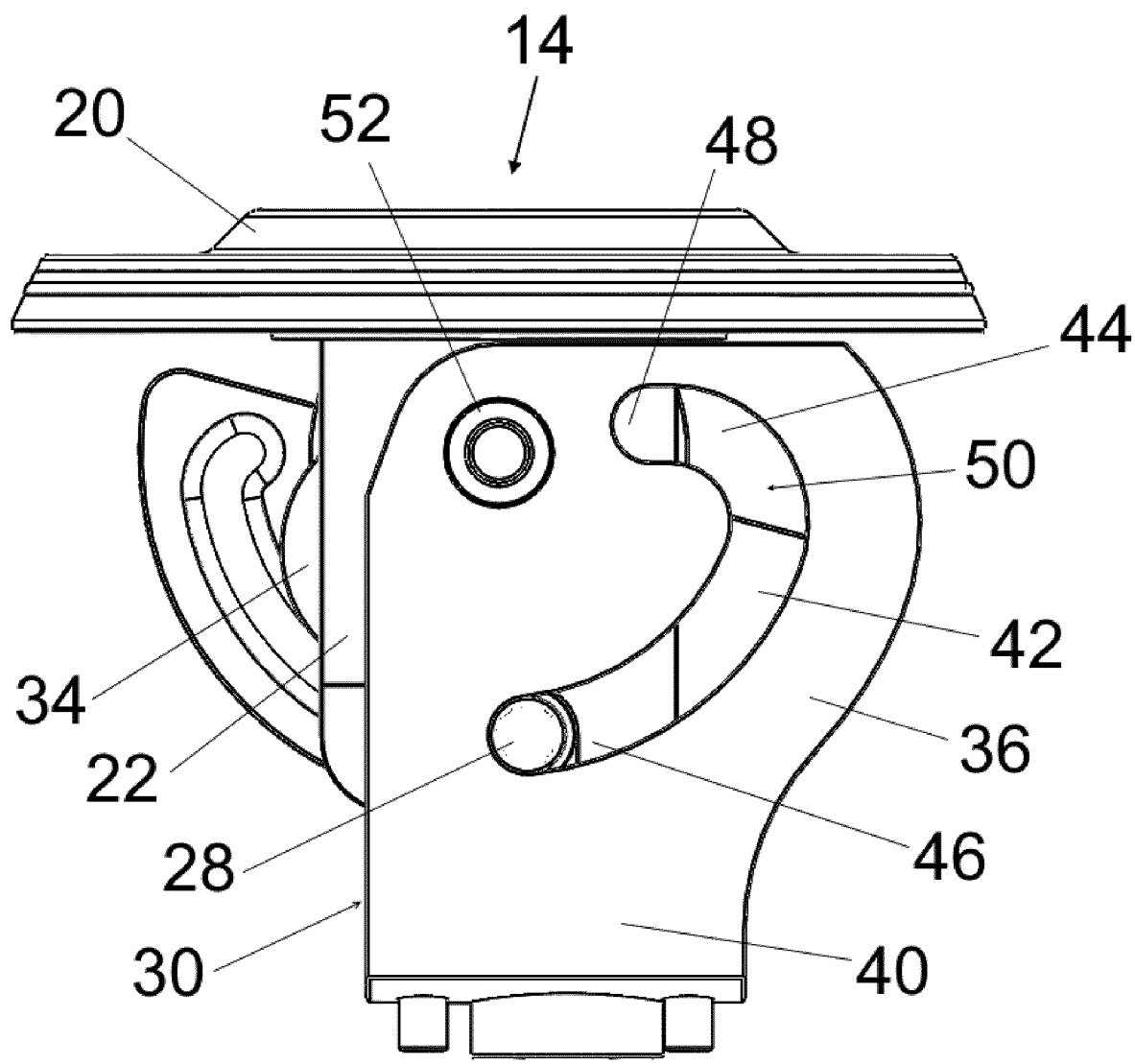
Figure 10C:
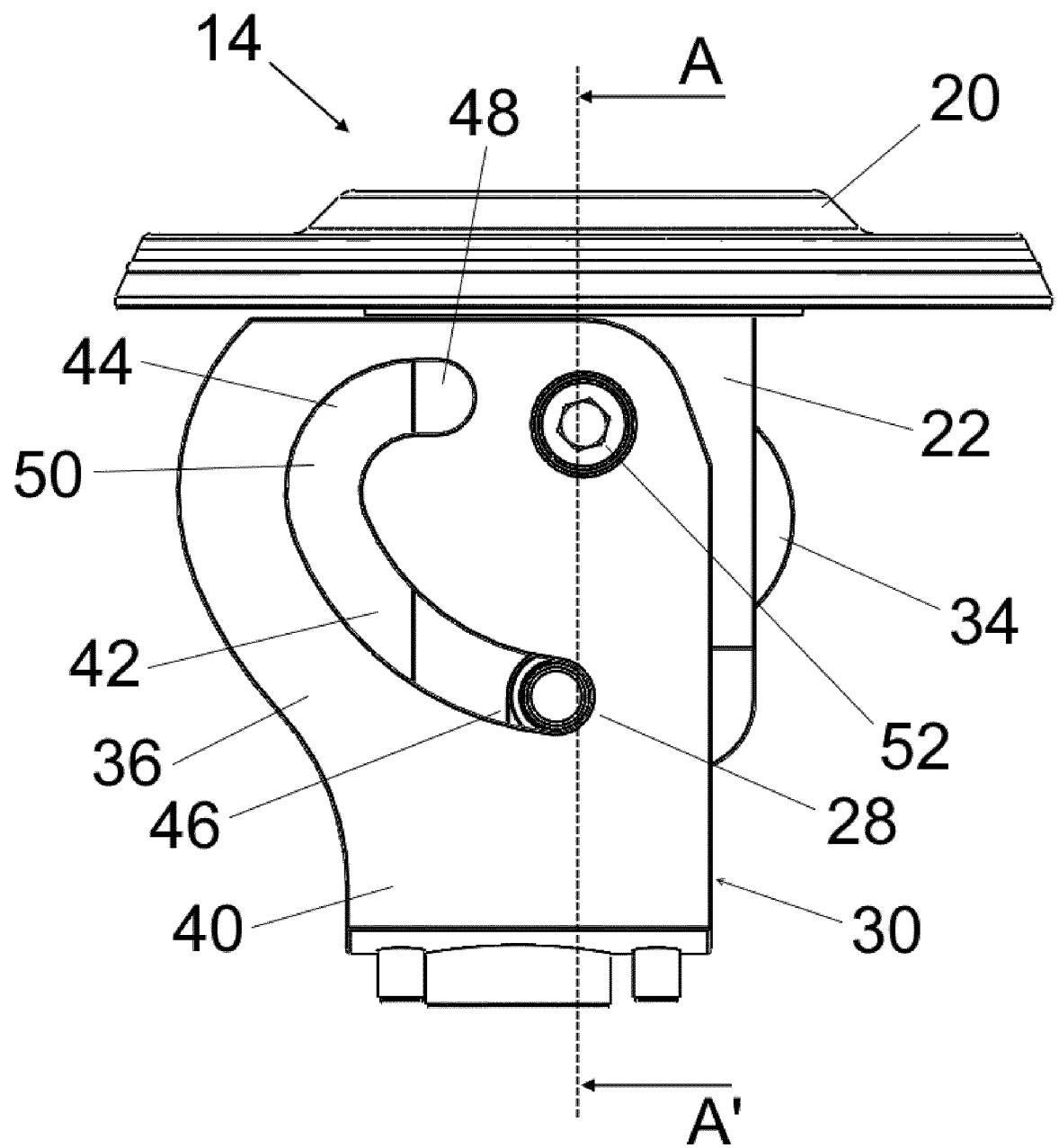
Figure 11A:
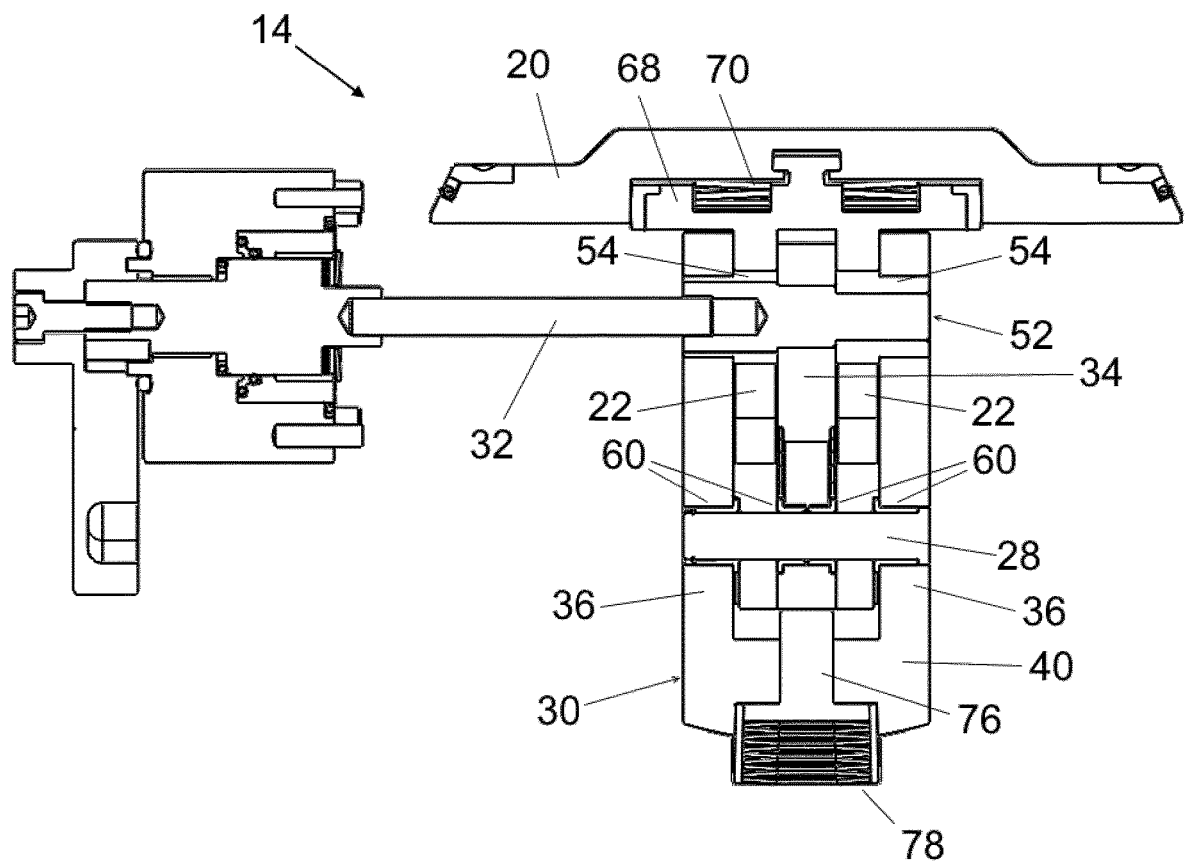
FIGS. 11a and 11b show cross-sectional views along section A-A' of the valve component of FIGS. 10a and 10c respectively.
Figure 11B:
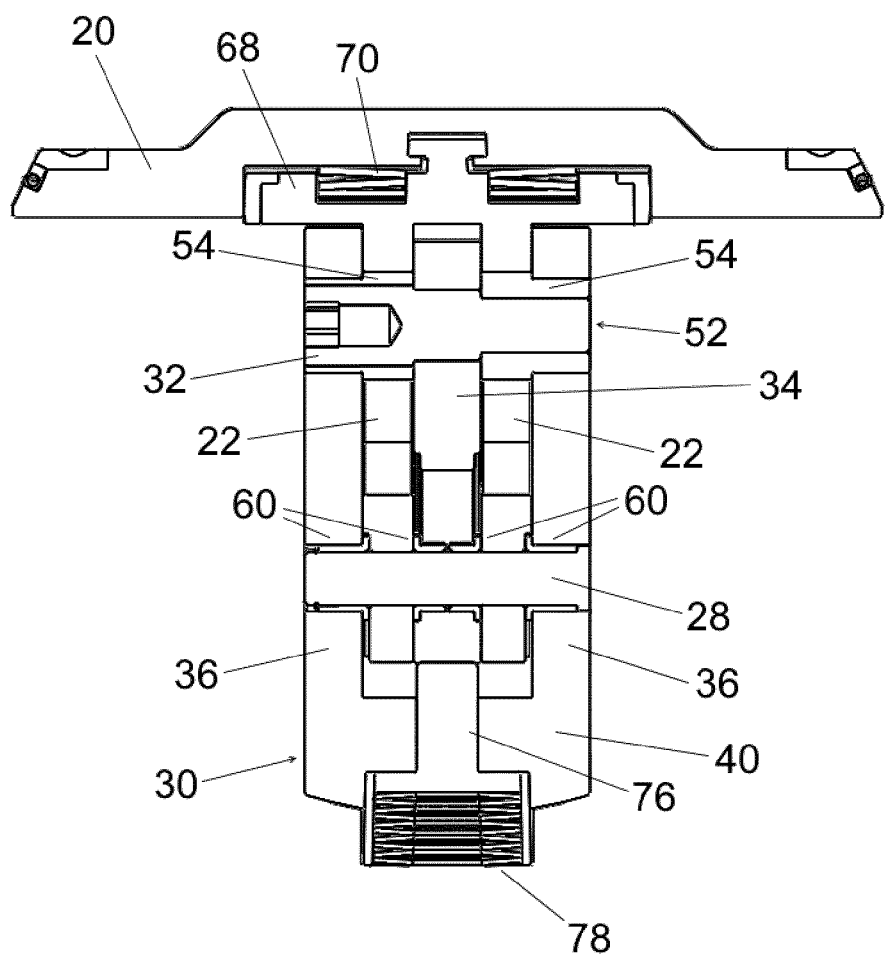
Figure 12:
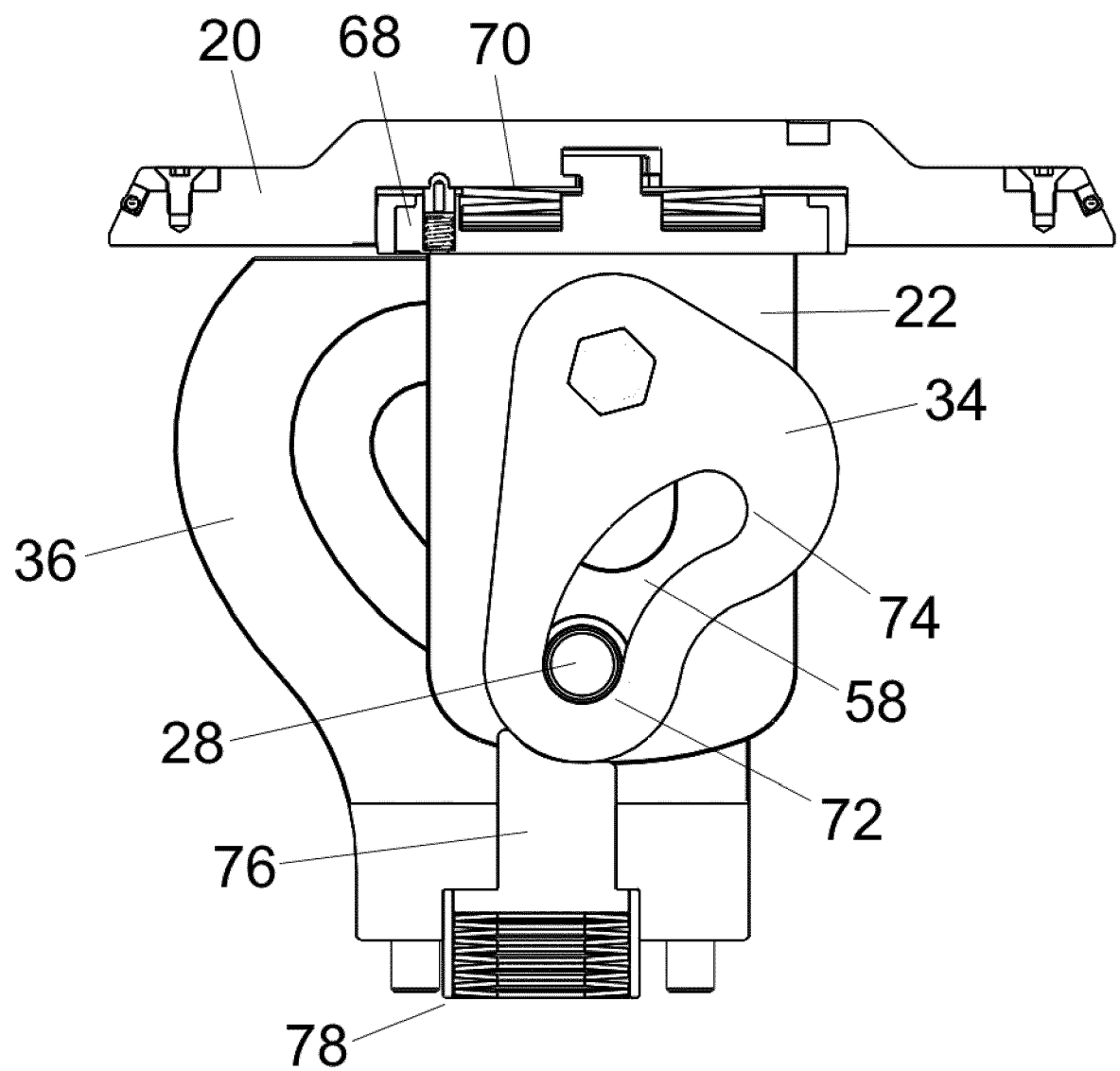
FIG. 12 shows a section view of a valve member forming part of the valve component of FIG. 9.
Figure 13:
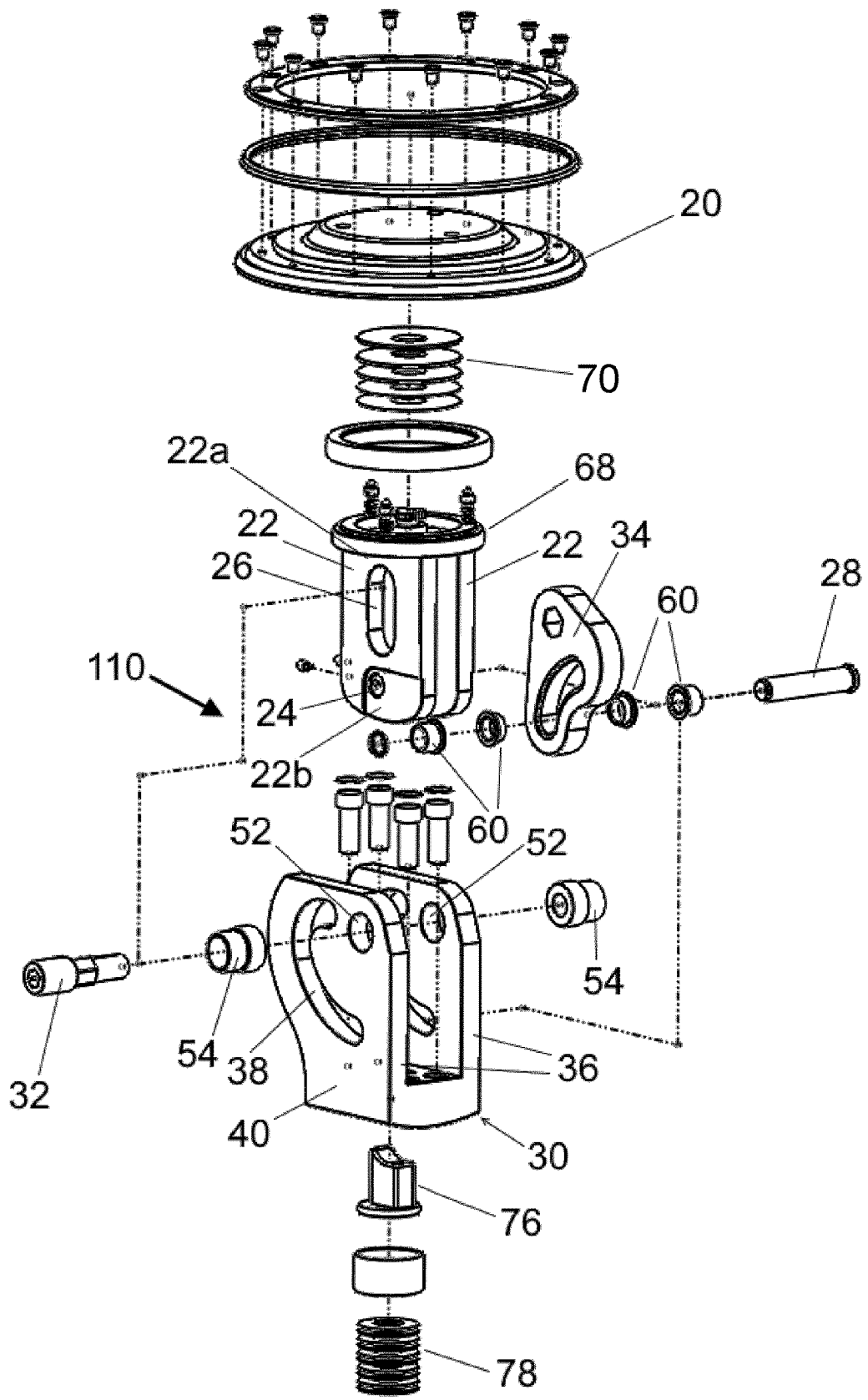
FIG. 13 shows an exploded view of the valve component of FIG. 9.

Operation of the valve 10 is described as follows, with reference to FIG. 7.

When the drive member 28 is located at the first end of the first guide slot portion 42 (i.e. the first terminating end 46 of the guide slot 38), the valve member is in a valve open position 62 in which the flap portion 20 is perpendicular to the cross-section of the hollow bore 16 of the valve housing 12 (i.e. the flap portion 20 bisects the hollow bore 16 of the valve housing 12). This opens the hollow bore 16 of the valve housing 12 and thereby permits the flowable material to flow along the hollow bore 16 of the valve housing 12 and therefore the hollow bore of the connected pipeline. The configuration of the valve member as a flap portion 20 that bisects the hollow bore 16 of the valve housing 12 in the valve open position 62 minimizes the resistance to the flow of the flowable material through the hollow bore 16 of the valve housing 12.

The provision of the guide and cam slots 38,58 in the valve component 14 allows the valve member to be securely held in the valve open position 62 during the flow of flowable material through the hollow bore 16 in both flow directions. More specifically, the interaction of the drive member 28 with the guide and cam slots 38,58 enables the cam 34 to be held stationary, by holding the shaft 32 stationary, in order to securely hold the valve member in the valve open position whilst flowable material flowing in the hollow bore 16 continuously pushes against the valve member. Omission of either the guide or cam slots 38,58 from the valve component 14 would allow the flowable material flowing in the hollow bore 16 to push against the valve member to force the valve member from the valve open position 62 to the valve closed position 66.

Rotating the shaft 32 to drive the drive member 28 to move from the first end of the first guide slot portion 42 to the second end of the first guide slot portion 42 causes the valve member to rotate 90° about the pivot sleeve 56. When the drive member 28 is at the point of connection 50 between the second end of the first guide slot portion 42 and the first end of the second guide slot portion 44, the valve member is in a valve intermediate position 64 in which the flap portion 20 is parallel with the cross-section of the hollow bore 16 of the valve housing 12 and separated by a gap from the seal 18. This partially closes the hollow bore 16 of the valve housing 12.

Further rotating the shaft 32 to drive the drive member 28 to move from the first end of the second guide slot portion 44 to the second end of the second guide slot portion 44 causes the valve member to linearly move relative to the pivot aperture 52 and towards the seal 18. When the drive member 28 is at the second end of the second guide slot portion 44 (i.e. the second terminating end 48 of the guide slot 38), the valve member is in a valve closed position 66 in which the flap portion 20 is parallel with the cross-section of the hollow bore 16 of the valve housing 12 and sealingly engages the seal 18. This closes the hollow bore 16 of the valve housing 12 and thereby prevents the flowable material from flowing along the hollow bore 16 of the valve housing 12 and therefore the hollow bore of the connected pipeline.

The provision of the valve control mechanism in the valve component 14 allows operation of the drive member 28 to linearly move the valve member against the seal 18 to further compress the seal 18. This is particularly useful in circumstances when the seal 18 transitions from a hard state to a soft state whilst it is warming up, e.g. from cryogenic temperatures to atmospheric temperatures. In addition, the speed at which the valve member is linearly moved between the valve intermediate position 64 and the valve closed position 66 may be varied to correspond to the rate of transition of the seal 18 from its hard state to its soft state, so as to ensure maximum compressibility of the seal 18 and thereby enhanced sealing of the hollow bore 16. In contrast, configuring the drive member 28 to be operable to only rotate the valve member between the valve open position 62 and the valve closed position 66 might result in poor compression of the seal 18, thus resulting in an ineffectively sealed hollow bore 16.

The hollow bore 16 of the valve housing 12 is re-opened by linearly moving the valve member from the valve closed position 66 to the valve intermediate position 64 and then rotating the valve member from the valve intermediate position 64 to the valve open position 62 through operation of the shaft 32 to drive the drive member 28 to move along the guide slot 38 in the opposite direction from the second terminating end 48 of the guide slot 38 to the first terminating end 46 of the guide slot 38.

In this manner the valve member is movable between the valve open position 62 and the valve closed position 66, and the drive member 28 is operable to rotate the valve member between the valve open position 62 and the valve intermediate position 64 and to linearly move the valve member between the valve intermediate position 64 and the valve closed position 66.

During the process of closing the hollow bore 16 of the valve housing 12, the drive member 28 is operated to directly control the speed at which the valve member is rotated between the valve open position 62 and the valve intermediate position 64 and the speed at which the valve member is linearly moved between the valve intermediate position 64 and the valve closed position 66 to provide a gradual closure of the hollow bore 16 of the valve housing 12. The speed at which the valve member moves from the valve open position 62 to the valve closed position 66 to provide a gradual closure of the hollow bore 16 of the valve housing 12 may vary depending on the type of flowable material flowing in the hollow bore 16 and its flow rate. The gradual closure of the hollow bore 16 of the valve housing 12 causes a gradual change in flow velocity of the flowable material in the hollow bore 16 of the valve housing 12 and thereby minimizes the risk of occurrence of a surge pressure in the connected pipeline that could damage the pipeline and other components connected to the pipeline.

In this manner the drive member 28 is operable to vary the speed at which the valve member is rotated between the valve open position 62 and the valve intermediate position 64 and to vary the speed at which the valve member is linearly moved between the valve intermediate position 64 and the valve closed position 66.

The provision of the valve control mechanism in the valve component 14 therefore results in a valve 10 that enhances the reliability and lifetime of the pipeline and other components connected to the pipeline.

In addition the interaction between the drive members 28 and the guide and cam slots 58 not only ensures proper operation of the drive member 28 to move the valve member between the valve open position 62 and the valve closed position 66, thus improving the reliability of the valve component 14, but also enables operation of the drive member 28 solely through application of rotary motion to the shaft 32 (and therefore to the cams 34), thus simplifying the operation of the valve component 14.

Furthermore the arrangement of the various components of the valve component 14 results in a compact arrangement of the valve component 14 without hindering the operation of the drive member 28 to move the valve member between the valve open position 62 and the valve closed position 66.

It is envisaged that, in other embodiments of the invention, the valve may be a unidirectional valve.

It is also envisaged that, in other embodiments of the invention, the compressible seal may be replaced by a non-compressible seal.

A valve according to a second embodiment of the invention is shown in FIGS. 8a to 8f and is designated generally by the reference numeral 110. The valve 110 of FIGS. 8a to 8f is similar in structure and operation to the valve 10 of FIGS. 1a to 1c, and like features share the same reference numerals.

The structure of the valve component 14 is shown in FIGS. 9 to 13.

The valve component 14 includes a valve member and a valve control mechanism. The valve member includes a flap portion 20 and a flap portion support 68.

The flap portion 20 is shaped in the form of a disc. The flap portion 20 includes an annular groove extending about its perimeter, where a seal 18 is located inside the annular groove. The diameter of the flap portion 20 is sized so that the seal 18 is capable of sealingly engaging a valve seat of the valve housing 12 to close the hollow bore 16 of the valve housing 12. Preferably the diameter of the flap portion 20 is 4, 6, 8, 10 or 12 inches.

The valve member further includes a pair of parallel stem portions 22 that project perpendicularly from a circular surface of the flap portion support 68. Each stem portion 22 includes proximal and distal ends 22a,22b. The proximal end 22a defines the point of attachment between each stem portion 22 and the flap portion support 68. The distal end 22b defines the furthest point of each stem portion 22 away from the flap portion support 68. Each stem portion 22 includes an internally threaded aperture 24 located near the distal end 22b of the stem portion 22. Each stem portion 22 further includes a valve member slot 26 that extends along the stem portion 22 between the aperture and the proximal end 22a of the stem portion 22. Each valve member slot 26 is shaped to define a linear slot.

The flap portion 20 is operably mounted on the flap portion support 68 to permit movement of the flap portion 20 relative to the flap portion support 68. More specifically, disc springs 70 in the form of Belleville washers are housed inside an internal annular cavity formed between the flap portion 20 and the flap portion support 68, where the disc springs 70 can be compressed by bringing the flap portion 20 and the flap portion support 68 towards each other. In this way the flap portion 20 forms a floating structure relative to the flap portion support 68.

It is envisaged that, in other embodiments of the invention, the disc springs 70 may be replaced by a different type of compressible biasing member, preferably a spring member.

The valve control mechanism includes a drive member 28, a guide element 30, a projecting member 32 and a cam 34. The projecting member 32 is in the form of a shaft but may be an axle or rod in other embodiments.

The drive member 28 is in the form of a shoulder bolt that is screwed into the internal thread of the threaded aperture 24 of each stem portion 22.

The guide element 30 is in the form of a mounting bracket 30 that includes a pair of opposing walls 36, each of which includes a guide slot 38. The mounting bracket 30 further includes a base 40 that interconnects the pair of opposing walls 36 and is secured to a wall of the valve housing 12.

The valve member, drive member 28 and guide element 30 are arranged so that the stem portions 22 of the valve member are located between the pair of opposing walls 36, and the drive member 28 extends through the guide slot 38 of each opposing wall 36.

The guide slot 38 in each opposing wall 36 includes first and second guide slot portions 42,44. The first guide slot portion 42 is shaped to define a one-quarter arcuate guide slot portion. The second guide slot portion 44 is shaped to define a linear guide slot portion. Each guide slot portion 42,44 includes first and second ends. For each guide slot 38, the first end of the first guide slot portion 42 defines a first terminating end 46 of the guide slot 38, the second end of the guide slot portion defines a second terminating end 48 of the guide slot 38, and the second end of the first guide slot portion 42 is continuously connected to the first end of the second guide slot portion 44 to define a point of connection 50 between the second end of the first guide slot portion 42 and the first end of the second guide slot portion 44.

Each opposing wall 36 further includes a pivot aperture 52. The shaft 32 extends through the pivot apertures 52 and through pivot bushes 54 respectively mounted in the pivot apertures 52. The pivot bushes 54 respectively extend through the valve member slots 26 in the stem portions 22 of the valve member. The pivot bushes 54 are sized and shaped so that the valve member is rotatable about the pivot bushes 54 and so that each pivot bush 54 is linearly movable along the length of the corresponding valve member slot 26.

The relative positions of the first guide slot portion 42 and pivot aperture 52 in each opposing wall 36 are arranged so that the movement of the drive member 28 along the first guide slot portion 42 causes rotation of the valve member about the pivot bushes 54. In this manner the valve member is pivotally mounted onto the mounting bracket 30.

The relative positions of the second guide slot portion 44 and pivot aperture 52 in each opposing wall 36 are arranged so that the movement of the drive member 28 along the second guide slot portion 44 causes linear movement of the valve member relative to the pivot bushes 54 and towards the valve seat of the valve housing 12.

The cam 34 is in the form of a cam plate and is mounted onto the shaft 32 so that the cam 34 is located between the stem portions 22 of the valve member so as to be flanked by the stem portions 22.

The cam 34 includes a cam slot 58 through which the drive member 28 extends. The drive member 28 further extends through cam bushes 60 mounted in the cam slot 58 and cam bushes 60 mounted in the guide slots 38. The cam slot 58 is shaped so that the rotation of the cam 34 drives the drive member 28 to move back and forth along each guide slot 38 between its terminating ends 46,48. The interaction of the cam 34 and drive member 28 in this manner permits a rotary motion applied to the shaft 32 to be converted by the cam 34 into a combination of rotary and linear motion that is required to drive the drive member 28 along each guide slot 38.

In the embodiment shown, the cam slot 58 is shaped to define a crescent-shaped cam slot 58 that defines a first recess 72 at a first end and a second recess 74 at a second end. The first recess 72 receives the drive member 28 when the drive member 28 is at the first terminating end 46 of each guide slot 38. The second recess 74 receives the drive member 28 when the drive member 28 is at the second terminating end 48 of each guide slot 38.

The shaft 32 further extends through a wall of the valve housing 12 so that it can be externally rotated from the exterior of the valve housing 12. The shaft 32 may be rotated by hand or machine.

The valve component further includes a retention device that is mounted on a wall of the valve housing and extends through the base 40. The retention device includes an engagement member 76 and a spring member 78. The engagement member 76 is in the form of a protrusion with a concave engagement surface. The spring member 78 is arranged between the engagement member 76 and the wall of the valve housing 12 so that the engagement member 76 forms a floating structure relative to the wall of the valve housing 12.

When the cam 34 is rotated so that the drive member 28 is at the first terminating end 46 of each guide slot 38, a convex surface of the cam 34 enters into mating engagement with the concave engagement surface of the engagement member 76. In turn the spring member 78 becomes compressed and thereby applies a biasing force to the engagement member 76 so as to urge the engagement member 76 towards the cam 34. At the same time the first recess 72 of the cam slot 34 receives the drive member 28.

Figure 14A:
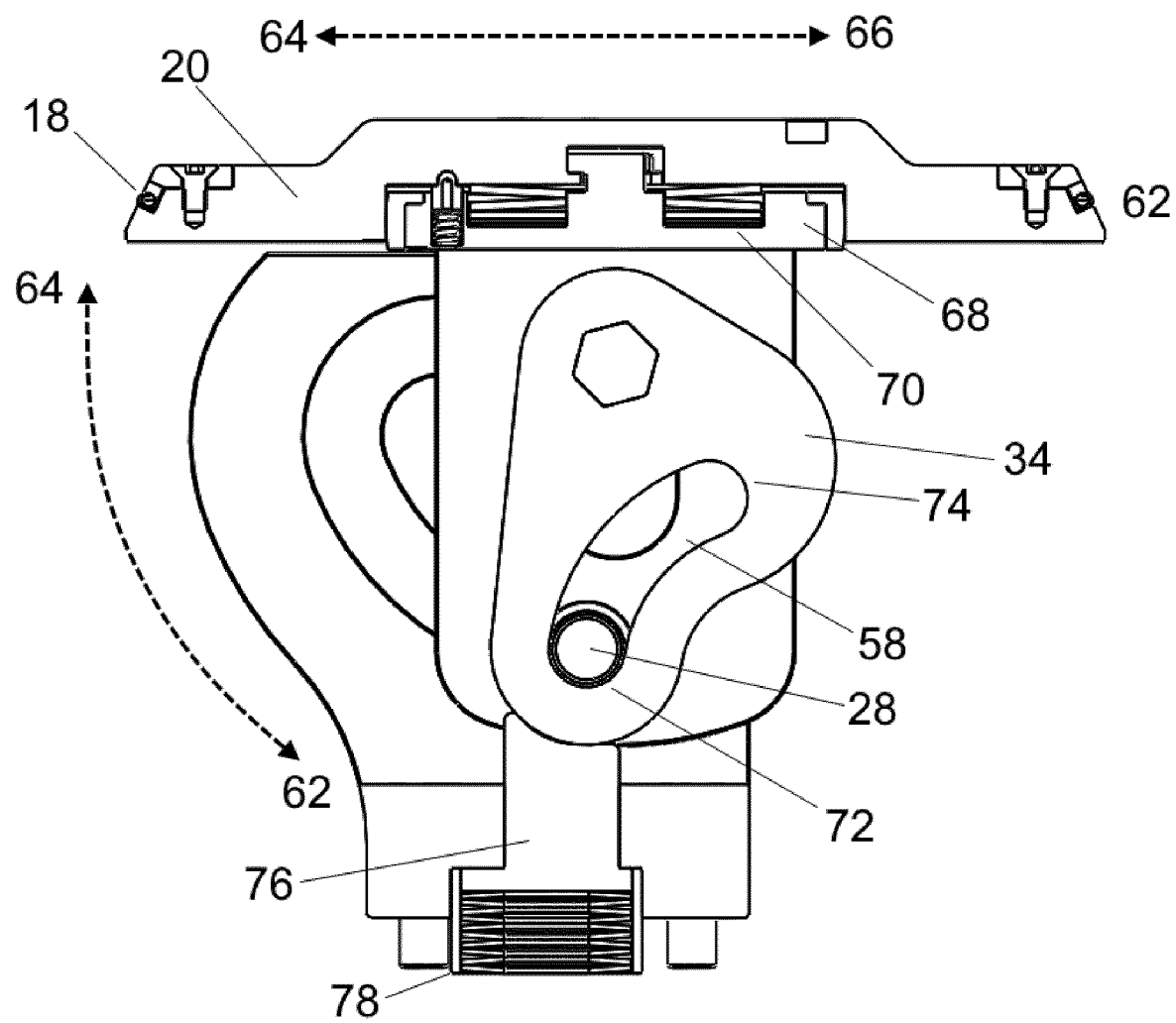
FIGS. 14a to 14c illustrate the operation of the valve component of FIG. 9.
Figure 14B:
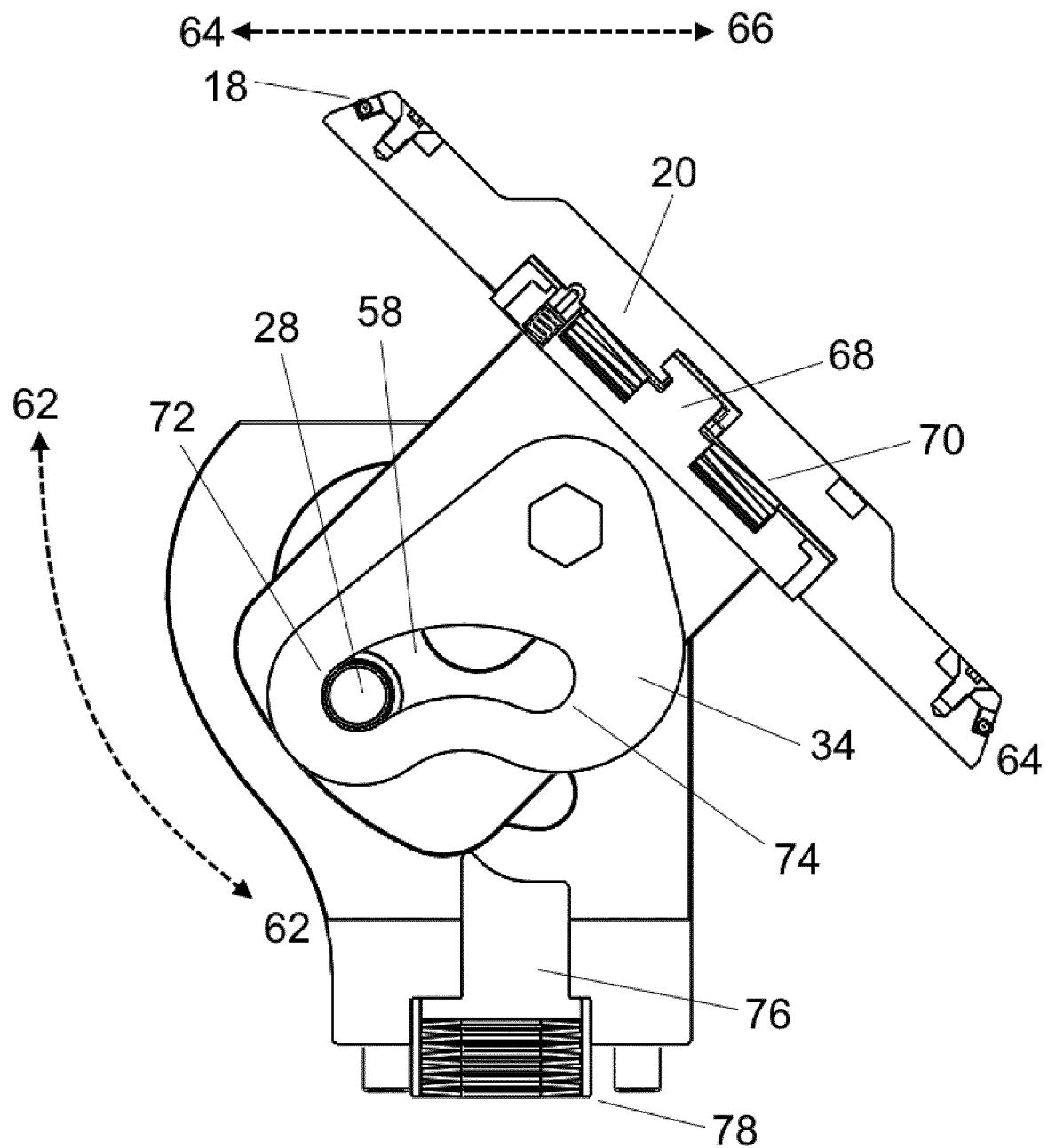
Figure 14C:
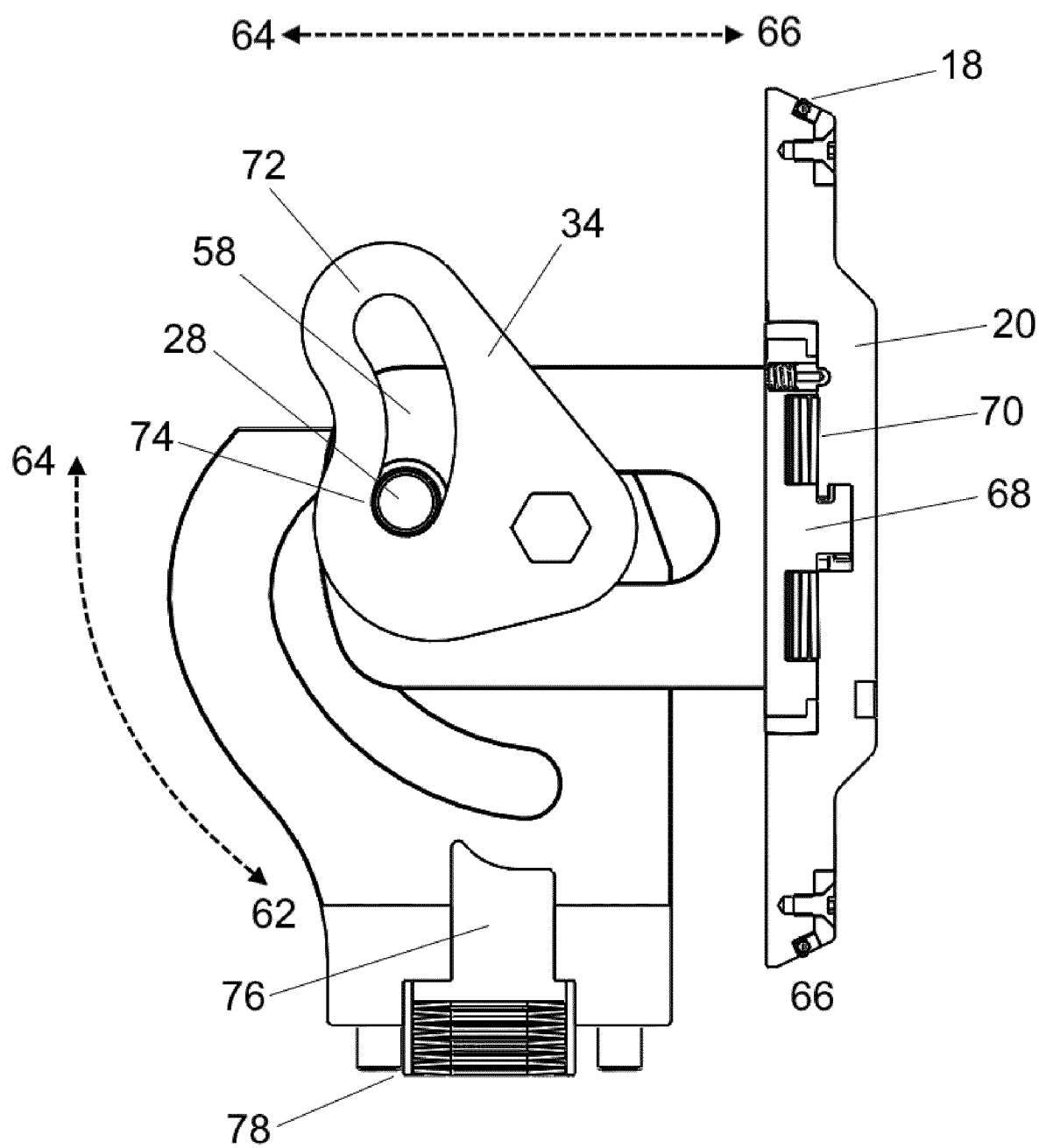

Operation of the valve 110 is described as follows, with reference to FIGS. 14a to 14c.

When the drive member 28 is located at the first end of the first guide slot portion 42 (i.e. the first terminating end 46 of each guide slot 38), the valve member is in a valve open position 62 in which the flap portion 20 is perpendicular to the cross-section of the hollow bore 16 of the valve housing 12 (i.e. the flap portion 20 bisects the hollow bore 16 of the valve housing 12). This opens the hollow bore 16 of the valve housing 12 and thereby permits the flowable material to flow along the hollow bore 16 of the valve housing 12 and therefore the hollow bore of the connected pipeline. The configuration of the valve member as a flap portion 20 that bisects the hollow bore 16 of the valve housing 12 in the valve open position 62 minimizes the resistance to the flow of the flowable material through the hollow bore 16 of the valve housing 12.

In the valve open position 62 of the valve member, the compressed spring member 78 urges the engagement member 76 into mating engagement with the cam 34 while the first recess 72 of the cam slot 34 receives the drive member 28. This helps to locate the cam 34 and drive member 28 in order to resist or prevent rotation of the valve member away from the valve open position 62 towards the valve intermediate position 64. This securely holds the valve member in the valve open position 62, without the need to maintain the application of a torque to the cam 34 either by hand or machine, in order to keep the valve member in the valve open position 62.

Rotating the shaft 32 to drive the drive member 28 to move from the first end of the first guide slot portion 42 to the second end of the first guide slot portion 42 causes the valve member to rotate 90° about the pivot bushes 54. Due to the compressibility of the spring member 78, the cam 34 can be disengaged from the engagement member 76 upon application of a sufficiently large torque to the shaft 32.

When the drive member 28 is at the point of connection 50 between the second end of the first guide slot portion 42 and the first end of the second guide slot portion 44, the valve member is in a valve intermediate position 64 in which the flap portion 20 is parallel with the cross-section of the hollow bore 16 of the valve housing 12 and separated by a gap from the valve seat. This partially closes the hollow bore 16 of the valve housing 12.

Further rotating the shaft 32 to drive the drive member 28 to move from the first end of the second guide slot portion 44 to the second end of the second guide slot portion 44 causes the valve member to linearly move relative to the pivot aperture 52 and towards the valve seat. When the drive member 28 is at the second end of the second guide slot portion 44 (i.e. the second terminating end 48 of the guide slot 38), the valve member is in a valve closed position 66 in which the flap portion 20 is parallel with the cross-section of the hollow bore 16 of the valve housing 12 and sealingly engages the valve seat. This closes the hollow bore 16 of the valve housing 12 and thereby prevents the flowable material from flowing along the hollow bore 16 of the valve housing 12 and therefore the hollow bore of the connected pipeline.

The provision of the valve control mechanism in the valve component 14 allows operation of the drive member 28 to linearly move the valve member against the valve seat to further compress the seal 18. This is particularly useful in circumstances when the seal 18 transitions from a hard state to a soft state whilst it is warming up, e.g. from cryogenic temperatures to atmospheric temperatures. In addition, the speed at which the valve member is linearly moved between the valve intermediate position 64 and the valve closed position 66 may be varied to correspond to the rate of transition of the seal 18 from its hard state to its soft state, so as to ensure maximum compressibility of the seal 18 and thereby enhanced sealing of the hollow bore 16. In contrast, configuring the drive member 28 to be operable to only rotate the valve member between the valve open position 62 and the valve closed position 66 might result in poor compression of the seal 18, thus resulting in an ineffectively sealed hollow bore 16.

Meanwhile, as the flap portion 20 sealingly engages the valve seat, the flap portion 20 is brought into closer proximity with the flap portion support 68. The ensuing compression of the disc springs 70 result in the application of a preload that urges the flap portion 20 towards the valve seat to help close the hollow bore 16. When there is a build-up of pressure in the closed-off hollow bore 16 (e.g. during a purging process), the compressibility of the disc springs 70 permit a limited push-back of the flap portion 20 to partially open the hollow bore 16, thus providing pressure relief. Once the pressure has dropped to a safe level, the disc springs 70 acts to bias the flap portion 20 to fully reclose the hollow bore 16.

In the valve closed position 66 of the valve member, the second recess 74 receives the drive member 28 so that the second recess 74 locates the drive member 28 to resist or prevent linear movement of the valve member away from the valve closed position 66 towards the valve intermediate position 64. This securely holds the valve member in the valve closed position 66, without the need to maintain the application of a torque to the cam 34 either by hand or machine, in order to keep the valve member in the valve closed position 66. Hence, the valve member is maintained in the valve closed position 66 even when a pushing force is applied to the flap portion 20 as a result of flowing flowable material or pressure build-up.

The hollow bore 16 of the valve housing 12 is re-opened by linearly moving the valve member from the valve closed position 66 to the valve intermediate position 64 and then rotating the valve member from the valve intermediate position 64 to the valve open position 62 through operation of the shaft 32 to drive the drive member 28 to move along the guide slot 38 in the opposite direction from the second terminating end 48 of the guide slot 38 to the first terminating end 46 of the guide slot 38.

Preferences and options for a given aspect, feature or parameter of the invention should, unless the context indicates otherwise, be regarded as having been disclosed in combination with any and all preferences and options for all other aspects, features and parameters of the invention.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the valve component as shown in the various exemplary embodiments is illustrative only. Additionally, any element disclosed in one embodiment may be incorporated or utilized with any other embodiment disclosed herein. For example, the disc spring of the exemplary embodiment shown in at least FIG. 11a may be incorporated in the valve component of the exemplary embodiment shown in at least 1a. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A valve component for a valve, the valve comprising a valve housing defining a hollow bore along which flowable material may flow, the valve component comprising:
    a valve member movable between:
        a valve open position for the valve member to open the hollow bore; and
        a valve closed position for the valve member to close the hollow bore; and
    a valve control mechanism including a drive member configured to be operable to move the valve member between the valve open position and the valve closed position, the drive member operable to rotate the valve member between the valve open position and a valve intermediate position and to linearly move the valve member between the valve intermediate position and the valve closed position, wherein the valve control mechanism includes a cam to drive the drive member, wherein the cam includes a cam slot to engage the drive member, wherein the cam slot includes a recess arranged to receive the drive member in the valve closed position of the valve member so that the recess locates the drive member to resist or prevent linear movement of the valve member away from the valve closed position towards the valve intermediate position.

2. The valve component of claim 1, wherein the valve control mechanism includes a guide element for guiding the drive member during its operation to rotate the valve member between the valve open position and the valve intermediate position and to linearly move the valve member between the valve intermediate position and the valve closed position.

3. The valve component of claim 2, wherein the guide element includes a guide slot.

4. The valve component of claim 3, wherein the guide slot includes first and second guide slot portions, the first guide slot portion shaped to define an arcuate guide slot portion, the second guide slot portion shaped to define a linear guide slot portion.

5. The valve component of claim 1, where the cam slot is shaped to define an arcuate cam slot or a crescent-shaped cam slot.

6. The valve component of claim 1, wherein the valve member includes a closure portion for closing the hollow bore, the valve member further including a biasing member configured to apply a biasing force to the closure portion so that the closure portion is urged to close the hollow bore in the valve closed position of the valve member.

7. The valve component of claim 6, wherein the valve member includes first and second valve member portions, the first valve member portion operably mounted onto a base of the valve component, the second valve member portion configured as the closure portion, the second valve member portion operably mounted on the first valve member portion to permit movement of the second valve member portion relative to the first valve member portion.

8. The valve component of claim 7, wherein the biasing member is arranged between the first and second valve member portions.

9. The valve component of claim 8, wherein the biasing member is housed inside an internal cavity formed between the first and second valve member portions.

10. The valve component of claim 6, wherein the biasing member is compressible.

11. The valve component of claim 6, wherein the biasing member is a disc spring.

12. The valve component of claim 1, wherein the drive member is configured to be operable to vary the speed at which the valve member is rotated between the valve open position and the valve intermediate position and/or to vary the speed at which the valve member is linearly moved between the valve intermediate position and the valve closed position.

13. A valve, for use in a fluid conduit, comprising:
   a valve housing defining a hollow bore along which flowable material may flow; and
   a valve component according to claim 1, wherein the valve component is located inside the valve housing.

14. A fluid conduit comprising a valve according to claim 13.

* * * * *